US012346524B2

(12) United States Patent
Rohaly

(10) Patent No.: US 12,346,524 B2
(45) Date of Patent: Jul. 1, 2025

(54) SYSTEMS AND METHODS FOR TOUCH SENSING

(71) Applicant: Gelsight, Inc., Waltham, MA (US)

(72) Inventor: Janos Rohaly, Concord, MA (US)

(73) Assignee: Gelsight, Inc., Waltham, MA (US)

( * ) Notice: Subject to any disclaimer, the term of this patent is extended or adjusted under 35 U.S.C. 154(b) by 0 days.

(21) Appl. No.: 18/077,226

(22) Filed: Dec. 7, 2022

(65) Prior Publication Data

US 2023/0359308 A1 Nov. 9, 2023

Related U.S. Application Data

(60) Provisional application No. 63/287,007, filed on Dec. 7, 2021.

(51) Int. Cl.
*G06F 3/042* (2006.01)

(52) U.S. Cl.
CPC .................. *G06F 3/042* (2013.01)

(58) Field of Classification Search
None
See application file for complete search history.

(56) References Cited

U.S. PATENT DOCUMENTS

| | | | |
|---|---|---|---|
| 4,668,861 A * | 5/1987 | White | G06F 3/0421 340/407.1 |
| 6,582,814 B2 | 6/2003 | Swiler et al. | |
| 7,077,009 B2 * | 7/2006 | Lokhorst | G01L 1/205 73/706 |

(Continued)

OTHER PUBLICATIONS

International Search Report and Written Opinion mailed Mar. 10, 2023, for PCT Application No. PCT/US22/81128, filed Dec. 7, 2022, twenty-four pages.
Johnson, M. K., & Adelson, E. H. (2009, June). Retrographic sensing for the measurement of surface texture and shape. In 2009 IEEE Conference on Computer Vision and Pattern Recognition (pp. 1070-1077). IEEE.

(Continued)

*Primary Examiner* — Fred Tzeng
(74) *Attorney, Agent, or Firm* — Vista IP Law Group, LLP

(57) ABSTRACT

One embodiment is directed to a system for characterizing interaction between surfaces, comprising: a deformable transmissive layer coupled to an interface membrane, wherein the interface membrane is interfaced against at least one aspect of an interfaced object; a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; a detector configured to detect light from within at least a portion of the deformable transmissive layer; and a computing system configured to operate the detector to detect at least a portion of light directed from the deformable transmissive layer, to determine surface orientations pertaining to positions along the interface membrane based at least in part upon interaction of the first illumination light with the deformable transmissive layer, and to utilize the determined surface orientations to characterize a geometric profile of the at least one aspect of the interfaced object as interfaced against the interface membrane.

30 Claims, 25 Drawing Sheets

(56) References Cited

U.S. PATENT DOCUMENTS

| | | | |
|---|---|---|---|
| 9,013,449 B2* | 4/2015 | Su | G06F 3/042 345/175 |
| 9,058,081 B2* | 6/2015 | Baxter | H03K 17/9636 |
| 9,112,058 B2 | 8/2015 | Bao et al. | |
| 9,127,938 B2 | 9/2015 | Adelson | |
| 9,538,056 B2 | 1/2017 | Adelson et al. | |
| 10,228,799 B2* | 3/2019 | Chen | G06F 3/045 |
| 2002/0084992 A1 | 7/2002 | Agnew | |
| 2008/0048972 A1* | 2/2008 | Kakarala | G06F 3/042 345/156 |
| 2008/0100593 A1* | 5/2008 | Skillman | G06F 3/042 345/175 |
| 2012/0169669 A1* | 7/2012 | Lee | G06F 3/042 348/E9.002 |
| 2012/0200533 A1* | 8/2012 | Salsman | G06F 3/042 345/175 |
| 2012/0305776 A1* | 12/2012 | Lai | G06F 3/042 250/353 |
| 2013/0027351 A1* | 1/2013 | Los | G06F 3/042 345/175 |
| 2013/0069913 A1* | 3/2013 | Wang | G06F 3/0421 345/175 |
| 2013/0070074 A1* | 3/2013 | Won | G02B 6/0013 382/128 |
| 2013/0314379 A1* | 11/2013 | Tsai | G06F 3/042 345/175 |
| 2014/0104395 A1 | 4/2014 | Rohaly et al. | |
| 2017/0169571 A1 | 6/2017 | Hung et al. | |
| 2017/0332911 A1* | 11/2017 | Won | G01L 1/247 |
| 2018/0029337 A1 | 2/2018 | Wilson et al. | |
| 2018/0049330 A1* | 2/2018 | Malik | G06F 1/16 |
| 2018/0330208 A1* | 11/2018 | Won | A61B 5/444 |
| 2021/0232243 A1* | 7/2021 | Ye | G06F 3/042 |

OTHER PUBLICATIONS

Yuan, W., Dong, S., & Adelson, E. H. (2017). Gelsight: High-resolution robot tactile sensors for estimating geometry and force. Sensors, 17(12), 2762.

Donlon, E., Dong, S., Liu, M., Li, J., Adelson, E., & Rodriguez, A. (2018, October). Gelslim: A high-resolution, compact, robust, and calibrated tactile-sensing finger. In 2018 IEEE/RSJ International Conference on Intelligent Robots and Systems (IROS) (pp. 1927-1934). IEEE.

Romero, B., Veiga, F., & Adelson, E. (2020, May). Soft, round, high resolution tactile fingertip sensors for dexterous robotic manipulation. In 2020 IEEE International Conference on Robotics and Automation (ICRA) (pp. 4796-4802). IEEE.

She, Y., Wang, S., Dong, S., Sunil, N., Rodriguez, A., & Adelson, E. (2021). Cable manipulation with a tactile-reactive gripper. The International Journal of Robotics Research, 40(12-14), 1385-1401.

Đorđević, Srdan, et al. "MC sensor—A novel method for measurement of muscle tension." Sensors 11.10 (2011): 9411-9425.

Esposito, Daniele, et al. "A piezoresistive sensor to measure muscle contraction and mechanomyography." Sensors 18.8 (2018): Article No. 2553.

Johnson, Micah K., and Edward H. Adelson. "Retrographic sensing for the measurement of surface texture and shape." 2009 IEEE Conference on Computer Vision and Pattern Recognition. IEEE, 2009.

Johnson, Micah K., et al. "Microgeometry capture using an elastomeric sensor." ACM Transactions on Graphics (TOG) 30.4 (2011): 1-8.

Edward H. Adelson, et al., File History for U.S. Appl. No. 61/512,680, filed Jul. 28, 2011.

Miller, B. H., Liu, H., & Kolle, M. (2022). Scalable optical manufacture of dynamic structural colour in stretchable materials. Nature Materials, 21(9), 1014-1018.

* cited by examiner

SYSTEMS AND METHODS FOR TOUCH SENSING

REFERENCE TO RELATED APPLICATIONS

This application claims benefit of U.S. Provisional Application No. 63/287,007, filed Dec. 7, 2021, the contents of which is incorporated herein by reference in its entirety.

FIELD OF THE INVENTION

The present invention relates generally to systems and methods for detecting contact or touch interfacing between specialized surfaces and other objects, and more specifically to integrations which may feature one or more deformable transmissive layers configured to assist in characterizing the detecting or touch interfacing.

BACKGROUND

Computing has become a key component of modern life with the ubiquity of systems such as laptop computers and smartphones. Referring to FIG. 1, a user (6) is shown in a typical work or home environment interacting with both a laptop computer (2) and a smartphone (4) simultaneously. Referring to FIG. 2A, a socalled "smart watch" is shown removably coupled to a forearm (8) of a user (6). FIG. 2B illustrates a smartphone (4) held with one hand (13) of a user while the other hand (12) of the user tries to utilize gesture information to provide commands to the smartphone (4) computing system. While these illustrative systems (2, 4, 10) may be configured to process voice-based or gesture-based commands, for example, much of the operation of such devices continues to occur through physical interfaces such as a keyboard or touchscreen. With regard to touch screens, often a user is interfacing one or more fingers against a planar surface with a relatively high bulk or structural modulus (i.e., it generally is fairly stiff and noncompliant to the touch), and the contact pattern may be detected by the touch sensor through determinations of capacitance and/or resistance. While capacitance and/or resistance based touch sensors definitely have been shown to have utility for certain fairly specific (and often planar) physical engagements between human and computer, such as socalled "mousepads" or touchscreens, there remains a need to improve the characterization of physical engagement between surfaces and objects so that such characterization can more aptly simulate the enormous amount of information garnered when, for example, a human hand is used as one of the engaging objects, as backed by the nervous system of the human. Described herein are systems, methods, and configurations for enhancing the characterization of touch in various scenarios, as well as utilizing such characterization for various purposes, including but not limited to wearable touch sensor implementations and configurations.

SUMMARY

One embodiment is directed to a system for characterizing interaction between surfaces, comprising: a deformable transmissive layer coupled to an interface membrane, wherein the interface membrane is interfaced against at least one aspect of an interfaced object; a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; a detector configured to detect light from within at least a portion of the deformable transmissive layer; and a computing system configured to operate the detector to detect at least a portion of light directed from the deformable transmissive layer, to determine surface orientations pertaining to positions along the interface membrane based at least in part upon interaction of the first illumination light with the deformable transmissive layer, and to utilize the determined surface orientations to characterize a geometric profile of the at least one aspect of the interfaced object as interfaced against the interface membrane. The interface membrane may be directly coupled between the deformable transmissive layer and the interfaced object. The system further may comprise a substantially rigid optical element positioned between the detector and the deformable transmissive layer. The first illumination source may be directly coupled to the substantially rigid optical element, and the substantially rigid optical element may be configured to distribute the first illumination light to the deformable transmissive layer. The substantially rigid optical element may be defined by a bottom surface, a top surface, and one or more sidewall surfaces, wherein the bottom surface is directly coupled to the deformable transmissive layer and the top surface is positioned most proximally adjacent to the detector. The substantially rigid optical element may comprise an outer shape substantially similar to one selected from the group consisting of: a cylindrical shape, a cubic shape, and a rectangular prismic shape. The first illumination source may be coupled to at least one of the one or more sidewall surfaces of the substantially rigid optical element. The system further may comprise a second illumination source operatively coupled to the deformable transmissive layer and configured to emit second illumination light into the deformable transmissive layer at a known second illumination orientation relative to the deformable transmissive layer, such that at least a portion of the second illumination light interacts with the deformable transmissive layer. The detector further may be configured to detect light from within at least a portion of the deformable transmissive layer based upon both the first illumination light and second illumination light, and the computing system may be configured to operate the detector to detect at least a portion of the first and second illumination light directed from the deformable transmissive layer, to determine surface orientations pertaining to positions along the interface membrane based at least in part upon interaction of the first and second illumination light with the deformable transmissive layer, and to utilize the determined surface orientations to characterize a geometric profile of the at least one aspect of the interfaced object as interfaced against the interface membrane. The second illumination light and first illumination light may have different wavelengths. The second illumination light and first illumination light may have different polarization. The system further may comprise a third illumination source operatively coupled to the deformable transmissive layer and configured to emit third illumination light into the deformable transmissive layer at a known third illumination orientation relative to the deformable transmissive layer, such that at least a portion of the third illumination light interacts with the deformable transmissive layer. The detector further may be configured to detect light from within at least a portion of the deformable transmissive layer based upon each of the first, second, and third illumination light, and wherein the computing system is configured to operate the detector to detect at least a portion of the first, second, and third illumination light directed from the deformable transmissive layer, to determine surface orientations pertaining to positions along the interface membrane based at least in part upon interaction of the first, second, and third illumination light with the deformable transmissive layer, and to utilize the determined surface orientations to characterize a geometric profile of the at least one aspect of the interfaced object as interfaced against the interface membrane. Each of the first, second, and third illumination light may have different wavelengths. The first, second, and third illumination light may not all have the same polarization. The first illumination source may comprise a light emitting diode. The detector may be a photodetector. The detector may be an image capture device. The image capture device may be a CCD or CMOS device. The system further may comprise a lens operatively coupled between the detector and the deformable transmissive layer. The computing system may be operatively coupled to the detector and configured to receive information from the detector pertaining to light detected by the detector from within the deformable transmissive layer. The computing system may be operatively coupled to the first illumination source and is configured to control emissions from the first illumination source. The deformable transmissive layer may comprise an elastomeric material. The elastomeric material may be selected from the group consisting of: silicone, urethane, polyurethane, thermoplastic elastomer (TPE), and thermoplastic polyurethane (TPU). The deformable transmissive layer may comprise a composite having a pigment material distributed within an elastomeric matrix, the pigment material configured to provide an illumination reflectance which is greater than that of the elastomer matrix. The pigment material may comprise a metal oxide. The deformable transmissive layer may be bounded by a bottom surface directly coupled to the interface membrane, a top surface most adjacent the detector, and a transmissive layer thickness therebetween, wherein the pigment material is distributed adjacent the bottom surface within the transmissive layer thickness to provide optimized illumination reflectance adjacent the bottom surface. The interface membrane may comprise an elastomeric material. The interface member and deformable transmissive layer each may have an elastic modulus which is substantially the same. The deformable transmissive layer and interface membrane may be directly coupled such that both principal and shear loads applied by the interfaced object are substantially transferred across the interface membrane to the deformable transmissive layer. The deformable transmissive layer may comprise a bladder configured to be at least partially filled with a fluid. The interface membrane may comprise an assembly of relatively thin and sequentially removable membrane components.

Another embodiment is directed to a system for characterizing interfacial interaction with at least one aspect of an interfaced object, comprising: a plurality of touch sensing assemblies, each of the plurality comprising a deformable transmissive layer coupled to an interface membrane, wherein the interface membrane is interfaced against the at least one aspect of the interfaced object; a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; and a detector configured to detect light from within at least a portion of the deformable transmissive layer; and a computing system operatively coupled to each of the touch sensing assemblies and configured to operate each of the detectors to detect at least a portion of light directed from each deformable transmissive layer, to determine surface orientations pertaining to positions along each interface membrane based at least in part upon interaction of the associated first illumination light with the associated deformable transmissive layers; wherein each of the plurality of touch sensing assemblies is configured to be interfaced against adjacent aspects of the interfaced object to generally address a surface of the interfaced object; and wherein the computing system is configured to utilize the determined surface orientations to characterize a geometric profile of the surface of the interfaced object as interfaced against the plurality of interface membranes. The plurality of touch sensing assemblies may be maintained in a position and orientation urged against the interfaced object by one or more removable coupling members configured to couple the touch sensing assemblies relative to each other, and relative to the interfaced object. The one or more removable coupling members may be configured to orient the interface membranes of each touch sensing assembly in a substantially surface-aligned manner relative to a nearby portion of the surface of the interfaced object. The one or more removably coupling members may comprise a removably attachable flexible substrate layer. The removably attachable flexible substrate layer may be configured to at least partially encircle the interfaced object. The computing system may be operatively coupled to each of the touch sensing assemblies utilizing wired connectivity. The computing system may be operatively coupled to each of the touch sensing assemblies utilizing wireless connectivity. At least one of the first illumination sources may comprise a light emitting diode. At least one of the detectors may be a photodetector. At least one of the detectors may be an image capture device. The image capture device may be a CCD or CMOS device. The computing system may be operatively coupled to the detectors and configured to receive information from the detectors pertaining to light detected by the detectors from within the deformable transmissive layers. The computing system may be operatively coupled to one or more of the first illumination sources and is configured to control emissions from said one or more first illumination sources. At least one of the deformable transmissive layers may comprise an elastomeric material. The elastomeric material may be selected from the group consisting of: silicone, urethane, polyurethane, thermoplastic elastomer (TPE), and thermoplastic polyurethane (TPU). The at least one of the deformable transmissive layers may comprise a composite having a pigment material distributed within an elastomeric matrix, the pigment material configured to provide an illumination reflectance which is greater than that of the elastomer matrix. The pigment material may comprise a metal oxide. The at least one deformable transmissive layer may be bounded by a bottom surface directly coupled to the interface membrane, a top surface most adjacent the detector, and a transmissive layer thickness therebetween, wherein the pigment material is distributed adjacent the bottom surface within the transmissive layer thickness to provide optimized illumination reflectance adjacent the bottom surface. At least one of the interface membranes may comprise an elastomeric material. The interface member and deformable transmissive layer each may have an elastic modulus which is substantially the same. At least one coupling of deformable transmissive layer and interface membrane may be directly coupled such that both principal and shear loads applied by the interfaced object are substantially transferred across the interface membrane of the coupling to the deformable transmissive layer of the coupling. At least one of the deformable transmissive layers may comprise a bladder configured to be at least partially filled with a fluid. At least one of the interface membranes may comprise an assembly of relatively thin and sequentially removable membrane components.

Another embodiment is directed to a system for characterizing interfacial interaction with at least one aspect of an interfaced body portion of a user, comprising: a plurality of touch sensing assemblies, each of the plurality comprising a deformable transmissive layer coupled to an interface membrane, wherein the interface membrane is interfaced against the at least one aspect of the interfaced body portion; a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; and a detector configured to detect light from within at least a portion of the deformable transmissive layer; and a computing system operatively coupled to each of the touch sensing assemblies and configured to operate each of the detectors to detect at least a portion of light directed from each deformable transmissive layer, to determine surface orientations pertaining to positions along each interface membrane based at least in part upon interaction of the associated first illumination light with the associated deformable transmissive layers; wherein each of the plurality of touch sensing assemblies is configured to be interfaced against adjacent aspects of the interfaced body portion to generally address a surface of the interfaced body portion; and wherein the computing system is configured to utilize the determined surface orientations to characterize a geometric profile of the aggregated area of the interfaced body portion as interfaced against the plurality of interface membranes. The plurality of touch sensing assemblies may be maintained in a position and orientation urged against the body portion by one or more removable coupling members configured to couple the touch sensing assemblies relative to each other, and relative to the interfaced object. The one or more removable coupling members may be configured to orient the interface membranes of each touch sensing assembly in a substantially co-planar manner relative to a nearby portion of the surface of the body portion. The one or more removably coupling members may comprise a removably attachable flexible substrate layer. The removably attachable flexible substrate layer may be configured to at least partially encircle the interfaced object. The removably attachable flexible substrate layer may comprise a cuff configured to be coupled against a skin surface of the body portion of the user. The computing system may be operatively coupled to each of the touch sensing assemblies utilizing wired connectivity. The computing system may be operatively coupled to each of the touch sensing assemblies utilizing wireless connectivity. At least one of the first illumination sources may comprise a light emitting diode. At least one of the detectors may be a photodetector. At least one of the detectors is may be image capture device. The image capture device may be a CCD or CMOS device. The computing system may be operatively coupled to the detectors and configured to receive information from the detectors pertaining to light detected by the detectors from within the deformable transmissive layers. The computing system may be operatively coupled to one or more of the first illumination sources and is configured to control emissions from said one or more first illumination sources. At least one of the deformable transmissive layers may comprise an elastomeric material. The elastomeric material may be selected from the group consisting of: silicone, urethane, polyurethane, thermoplastic elastomer (TPE), and thermoplastic polyurethane (TPU). The at least one of the deformable transmissive layers may comprise a composite having a pigment material distributed within an elastomeric matrix, the pigment material configured to provide an illumination reflectance which is greater than that of the elastomer matrix. The pigment material may comprise a metal oxide. The at least one deformable transmissive layer may be bounded by a bottom surface directly coupled to the interface membrane, a top surface most adjacent the detector, and a transmissive layer thickness therebetween, wherein the pigment material is distributed adjacent the bottom surface within the transmissive layer thickness to provide optimized illumination reflectance adjacent the bottom surface. At least one of the interface membranes may comprise an elastomeric material. The interface member and deformable transmissive layer each may have an elastic modulus which is substantially the same. At least one coupling of deformable transmissive layer and interface membrane may be directly coupled such that both principal and shear loads applied by the interfaced object are substantially transferred across the interface membrane of the coupling to the deformable transmissive layer of the coupling. At least one of the deformable transmissive layers may comprise a bladder configured to be at least partially filled with a fluid. At least one of the interface membranes may comprise an assembly of relatively thin and sequentially removable membrane components.

Another embodiment is directed to a system for predicting commands of a user by characterizing interfacial interaction with at least one aspect of an interfaced body portion of the user, comprising: a plurality of touch sensing assemblies, each of the plurality comprising a deformable transmissive layer coupled to an interface membrane, wherein the interface membrane is interfaced against the at least one aspect of the interfaced body portion; a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; and a detector configured to detect light from within at least a portion of the deformable transmissive layer; a secondary sensor configured to sense a secondary indicator of operation of the body portion and produce a secondary indicator output; and a computing system operatively coupled to the secondary sensor and each of the touch sensing assemblies, the computing system configured to operate each of the detectors to detect at least a portion of light directed from each deformable transmissive layer, to determine surface orientations pertaining to positions along each interface membrane based at least in part upon interaction of the associated first illumination light with the associated deformable transmissive layers, and to sense the secondary indicator of operation of the body portion using the secondary sensor; wherein each of the plurality of touch sensing assemblies is configured to be interfaced against adjacent aspects of the interfaced body portion to generally address a surface of the interfaced body portion; wherein the computing system is configured to utilize the determined surface orientations to characterize a geometric profile of the surface of the interfaced body portion as interfaced against the plurality of interface membranes; and wherein characterizing the geometric profile of the surface provides an output which is at least partially uncorrelated relative to the secondary indicator output, such that the computing system is further configured to assist in predicting commands of the user based at least in part upon both the secondary indicator output and the characterization of the geometric profile of the surface of the interfaced body portion. The secondary sensor may be selected from the group consisting of: a temperature sensor, a capacitive contact sensor, a resistive contact sensor, an electromyography electrode, a pressure transducer, an elongate sensor, and a inertial measurement unit. The secondary sensor may be an inertial measurement unit comprising at least one accelerometer and at least one gyro. The secondary sensor may be coupled to the body portion of the user. The secondary sensor may be coupled at least one of the one or more touch sensing assemblies. The secondary sensor may be coupled to an independent system which is coupled to the body portion. The secondary sensor may be coupled to a portable computing device which is coupled to the body portion. The secondary sensor may be coupled to the computing system by wired connectivity. The secondary sensor may be coupled to the computing system by wireless connectivity. The system may be configured to utilize the characterized geometric profile of the surface, along with secondary indicator output acceleration to predict commands of the user. Known modulus information pertaining to one or more of the touch sensing assemblies may be utilized to estimate interfacial forces applied between the body portion and the one or more touch sensing assemblies. The plurality of touch sensing assemblies may be maintained in a position and orientation urged against the body portion by one or more removable coupling members configured to couple the touch sensing assemblies relative to each other, and relative to the interfaced object. The one or more removable coupling members may be configured to orient the interface membranes of each touch sensing assembly in a substantially co-planar manner relative to a nearby portion of the surface of the body portion. The one or more removably coupling members may comprise a removably attachable flexible substrate layer. The removably attachable flexible substrate layer may be configured to at least partially encircle the interfaced object. The removably attachable flexible substrate layer may comprise a cuff configured to be coupled against a skin surface of the body portion of the user. The computing system may be operatively coupled to each of the touch sensing assemblies utilizing wired connectivity. The computing system may be operatively coupled to each of the touch sensing assemblies utilizing wireless connectivity. At least one of the first illumination sources may comprise a light emitting diode. At least one of the detectors may be a photodetector. At least one of the detectors may be an image capture device. The image capture device may be a CCD or CMOS device. The computing system may be operatively coupled to the detectors and configured to receive information from the detectors pertaining to light detected by the detectors from within the deformable transmissive layers. The computing system may be operatively coupled to one or more of the first illumination sources and is configured to control emissions from said one or more first illumination sources. At least one of the deformable transmissive layers may comprise an elastomeric material. The elastomeric material may be selected from the group consisting of: silicone, urethane, polyurethane, thermoplastic elastomer (TPE), and thermoplastic polyurethane (TPU). The at least one of the deformable transmissive layers may comprise a composite having a pigment material distributed within an elastomeric matrix, the pigment material configured to provide an illumination reflectance which is greater than that of the elastomer matrix. The pigment material may comprise a metal oxide. the at least one deformable transmissive layer may be bounded by a bottom surface directly coupled to the interface membrane, a top surface most adjacent the detector, and a transmissive layer thickness therebetween, wherein the pigment material is distributed adjacent the bottom surface within the transmissive layer thickness to provide optimized illumination reflectance adjacent the bottom surface. At least one of the interface membranes may comprise an elastomeric material. The interface member and deformable transmissive layer each may have an elastic modulus which is substantially the same. At least one coupling of deformable transmissive layer and interface membrane may be directly coupled such that both principal and shear loads applied by the interfaced object are substantially transferred across the interface membrane of the coupling to the deformable transmissive layer of the coupling. At least one of the the deformable transmissive layers may comprise a bladder configured to be at least partially filled with a fluid. At least one of the interface membranes may comprise an assembly of relatively thin and sequentially removable membrane components. The secondary sensor may be coupled to the plurality of touch sensing assemblies. The secondary sensor may be operatively coupled with but not co-located with the plurality of touch sensing assemblies.

Another embodiment is directed to a system for predicting commands of a user by characterizing interfacial interaction with at least one aspect of an interfaced body portion of the user, comprising: a plurality of touch sensing assemblies, each of the plurality comprising a deformable transmissive layer coupled to an interface membrane, wherein the interface membrane is interfaced against the at least one aspect of the interfaced body portion; a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; and a detector configured to detect light from within at least a portion of the deformable transmissive layer; a secondary sensor configured to sense a secondary indicator of operation of the body portion and produce a secondary indicator output; and a computing system operatively coupled to the secondary sensor and each of the touch sensing assemblies, the computing system configured to operate each of the detectors to detect at least a portion of light directed from each deformable transmissive layer, to determine surface orientations pertaining to positions along each interface membrane based at least in part upon interaction of the associated first illumination light with the associated deformable transmissive layers, and to sense the secondary indicator of operation of the body portion using the secondary sensor; wherein each of the plurality of touch sensing assemblies is configured to be interfaced against adjacent aspects of the interfaced body portion to generally address a surface of the interfaced body portion; wherein the computing system is configured to utilize the determined surface orientations to characterize a geometric profile of the surface of the interfaced body portion as interfaced against the plurality of interface membranes; and wherein the computing system is further configured to assist in predicting commands of the user based at least in part upon both the secondary indicator output and the characterization of the geometric profile of the surface as analyzed at runtime utilizing a neural network computing configuration trained using a library of prior operation data. The neural network computing configuration may be trained utilizing a library of prior operation data based upon similar combinations of touch sensing assemblies and interfaced body portions for a plurality of different users. The neural network computing configuration may be trained utilizing a library of prior operation data based upon similar combinations of touch sensing assemblies and interfaced body portions for a plurality of different prior sessions with the same user. The neural network computing configuration may be trained based upon a supervised learning model wherein a training library comprising a relatively large number predetermined relationships between characterized surface profiles, secondary sensor outputs, and intended user commands is utilized to develop correlations. The neural network computing configuration may be trained based upon a reinforcement learning model wherein a training library comprising a relatively large number predetermined relationships between characterized surface profiles, secondary sensor outputs, intended user commands, and intended user objectives is utilized to develop correlations. The secondary sensor may be selected from the group consisting of: a temperature sensor, a capacitive contact sensor, a resistive contact sensor, an electromyography electrode, a pressure transducer, an elongate sensor, a moisture sensor, and an inertial measurement unit (IMU). The secondary sensor may be an inertial measurement unit comprising at least one accelerometer and at least one gyro. The secondary sensor may be coupled to the body portion of the user. The secondary sensor may be coupled at least one of the one or more touch sensing assemblies. The secondary sensor may be coupled to an independent system which is coupled to the body portion. The secondary sensor may be coupled to a portable computing device which is coupled to the body portion. The secondary sensor may be coupled to the computing system by wired connectivity. The secondary sensor may be coupled to the computing system by wireless connectivity. The system may be configured to utilize the characterized geometric profile of the surface, along with secondary indicator output acceleration to predict commands of the user. Known modulus information pertaining to one or more of the touch sensing assemblies may be utilized to estimate interfacial forces applied between the body portion and the one or more touch sensing assemblies. The plurality of touch sensing assemblies may be maintained in a position and orientation urged against the body portion by one or more removable coupling members configured to couple the touch sensing assemblies relative to each other, and relative to the interfaced object. The one or more removable coupling members may be configured to orient the interface membranes of each touch sensing assembly in a substantially co-planar manner relative to a nearby portion of the surface of the body portion. The one or more removably coupling members may comprise a removably attachable flexible substrate layer. The removably attachable flexible substrate layer may be configured to at least partially encircle the interfaced object. The removably attachable flexible substrate layer may comprise a cuff configured to be coupled against a skin surface of the body portion of the user. The computing system may be operatively coupled to each of the touch sensing assemblies utilizing wired connectivity. The computing system may be operatively coupled to each of the touch sensing assemblies utilizing wireless connectivity. At least one of the first illumination sources may comprise a light emitting diode. At least one of the detectors may be a photodetector. At least one of the detectors may be an image capture device. The image capture device may be a CCD or CMOS device. The computing system may be operatively coupled to the detectors and configured to receive information from the detectors pertaining to light detected by the detectors from within the deformable transmissive layers. The computing system may be operatively coupled to one or more of the first illumination sources and is configured to control emissions from said one or more first illumination sources. At least one of the deformable transmissive layers may comprise an elastomeric material. The elastomeric material may be selected from the group consisting of: silicone, urethane, polyurethane, thermoplastic elastomer (TPE), and thermoplastic polyurethane (TPU). The at least one of the deformable transmissive layers may comprise a composite having a pigment material distributed within an elastomeric matrix, the pigment material configured to provide an illumination reflectance which is greater than that of the elastomer matrix. The pigment material may comprise a metal oxide. The at least one deformable transmissive layer may be bounded by a bottom surface directly coupled to the interface membrane, a top surface most adjacent the detector, and a transmissive layer thickness therebetween, wherein the pigment material is distributed adjacent the bottom surface within the transmissive layer thickness to provide optimized illumination reflectance adjacent the bottom surface. At least one of the interface membranes may comprise an elastomeric material. The interface member and deformable transmissive layer each may have an elastic modulus which is substantially the same. At least one coupling of deformable transmissive layer and interface membrane may be directly coupled such that both principal and shear loads applied by the interfaced object are substantially transferred across the interface membrane of the coupling to the deformable transmissive layer of the coupling. At least one of the the deformable transmissive layers may comprise a bladder configured to be at least partially filled with a fluid. At least one of the interface membranes may comprise an assembly of relatively thin and sequentially removable membrane components. The secondary sensor may be coupled to the plurality of touch sensing assemblies. The secondary sensor may be operatively coupled with but not co-located with the plurality of touch sensing assemblies.

Another embodiment is directed to a method for characterizing interaction between surfaces, comprising: providing a deformable transmissive layer, a first illumination source, a detector, and a computing system, wherein the deformable transmissive layer is coupled to an interface membrane, the interface membrane is interfaced against at least one aspect of an interfaced object, the first illumination source is operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer, the detector is configured to detect light from within at least a portion of the deformable transmissive layer; and the computing system is configured to operate the detector; and utilizing the computing system to detect at least a portion of light directed from the deformable transmissive layer, to determine surface orientations pertaining to positions along the interface membrane based at least in part upon interaction of the first illumination light with the deformable transmissive layer, and to utilize the determined surface orientations to characterize a geometric profile of the at least one aspect of the interfaced object as interfaced against the interface membrane. The interface membrane may be directly coupled between the deformable transmissive layer and the interfaced object. The method further may comprise providing a substantially rigid optical element positioned between the detector and the deformable transmissive layer. The first illumination source may be directly coupled to the substantially rigid optical element, and wherein the substantially rigid optical element is configured to distribute the first illumination light to the deformable transmissive layer. The substantially rigid optical element may be defined by a bottom surface, a top surface, and one or more sidewall surfaces, wherein the bottom surface is directly coupled to the deformable transmissive layer and the top surface is positioned most proximally adjacent to the detector. The substantially rigid optical element may comprise an outer shape substantially similar to one selected from the group consisting of: a cylindrical shape, a cubic shape, and a rectangular prismic shape. The first illumination source may be coupled to at least one of the one or more sidewall surfaces of the substantially rigid optical element. The method further may comprise providing a second illumination source operatively coupled to the deformable transmissive layer and configured to emit second illumination light into the deformable transmissive layer at a known second illumination orientation relative to the deformable transmissive layer, such that at least a portion of the second illumination light interacts with the deformable transmissive layer. The detector may be further configured to detect light from within at least a portion of the deformable transmissive layer based upon both the first illumination light and second illumination light, and wherein the computing system is configured to operate the detector to detect at least a portion of the first and second illumination light directed from the deformable transmissive layer, to determine surface orientations pertaining to positions along the interface membrane based at least in part upon interaction of the first and second illumination light with the deformable transmissive layer, and to utilize the determined surface orientations to characterize a geometric profile of the at least one aspect of the interfaced object as interfaced against the interface membrane. The second illumination light and first illumination light may have different wavelengths. The second illumination light and first illumination light may have different polarization. The method further may comprise providing a third illumination source operatively coupled to the deformable transmissive layer and configured to emit third illumination light into the deformable transmissive layer at a known third illumination orientation relative to the deformable transmissive layer, such that at least a portion of the third illumination light interacts with the deformable transmissive layer. The detector may be further configured to detect light from within at least a portion of the deformable transmissive layer based upon each of the first, second, and third illumination light, and wherein the computing system is configured to operate the detector to detect at least a portion of the first, second, and third illumination light directed from the deformable transmissive layer, to determine surface orientations pertaining to positions along the interface membrane based at least in part upon interaction of the first, second, and third illumination light with the deformable transmissive layer, and to utilize the determined surface orientations to characterize a geometric profile of the at least one aspect of the interfaced object as interfaced against the interface membrane. Each of the first, second, and third illumination light may have different wavelengths. The first, second, and third illumination light may not all have the same polarization. The first illumination source may comprise a light emitting diode. The detector may be a photodetector. The detector may be an image capture device. The image capture device may be a CCD or CMOS device. The method further may comprise providing a lens operatively coupled between the detector and the deformable transmissive layer. The computing system may be operatively coupled to the detector and configured to receive information from the detector pertaining to light detected by the detector from within the deformable transmissive layer. The computing system may be operatively coupled to the first illumination source and is configured to control emissions from the first illumination source. The deformable transmissive layer may comprise an elastomeric material. The elastomeric material may be selected from the group consisting of: silicone, urethane, polyurethane, thermoplastic elastomer (TPE), and thermoplastic polyurethane (TPU). The deformable transmissive layer may comprise a composite having a pigment material distributed within an elastomeric matrix, the pigment material configured to provide an illumination reflectance which is greater than that of the elastomer matrix. The pigment material may comprise a metal oxide. The deformable transmissive layer may be bounded by a bottom surface directly coupled to the interface membrane, a top surface most adjacent the detector, and a transmissive layer thickness therebetween, wherein the pigment material is distributed adjacent the bottom surface within the transmissive layer thickness to provide optimized illumination reflectance adjacent the bottom surface. The interface membrane may comprise an elastomeric material. The interface member and deformable transmissive layer each may have an elastic modulus which is substantially the same. The deformable transmissive layer and interface membrane may be directly coupled such that both principal and shear loads applied by the interfaced object are substantially transferred across the interface membrane to the deformable transmissive layer. The deformable transmissive layer may comprise a bladder configured to be at least partially filled with a fluid. The interface membrane may comprise an assembly of relatively thin and sequentially removable membrane components.

Another embodiment is directed to method for characterizing interfacial interaction with at least one aspect of an interfaced object, comprising: providing a plurality of touch sensing assemblies and a computing system operatively coupled to each of the touch sensing assemblies, wherein each of the plurality comprises: a deformable transmissive layer coupled to an interface membrane, the interface membrane interfaced against the at least one aspect of the interfaced object; a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; and a detector configured to detect light from within at least a portion of the deformable transmissive layer; and utilizing the computing system to operate each of the detectors to detect at least a portion of light directed from each deformable transmissive layer, to determine surface orientations pertaining to positions along each interface membrane based at least in part upon interaction of the associated first illumination light with the associated deformable transmissive layers; wherein each of the plurality of touch sensing assemblies is configured to be interfaced against adjacent aspects of the interfaced object to generally address a surface of the interfaced object; and wherein the computing system is configured to utilize the determined surface orientations to characterize a geometric profile of the surface of the interfaced object as interfaced against the plurality of interface membranes. The plurality of touch sensing assemblies may be maintained in a position and orientation urged against the interfaced object by one or more removable coupling members configured to couple the touch sensing assemblies relative to each other, and relative to the interfaced object. The one or more removable coupling members may be configured to orient the interface membranes of each touch sensing assembly in a substantially surface-aligned manner relative to a nearby portion of the surface of the interfaced object. The one or more removably coupling members may comprise a removably attachable flexible substrate layer. The removably attachable flexible substrate layer may be configured to at least partially encircle the interfaced object. The computing system may be operatively coupled to each of the touch sensing assemblies utilizing wired connectivity. The computing system may be operatively coupled to each of the touch sensing assemblies utilizing wireless connectivity. At least one of the first illumination sources may comprise a light emitting diode. At least one of the detectors may be a photodetector. At least one of the detectors may be an image capture device. The image capture device may be a CCD or CMOS device. The computing system may be operatively coupled to the detectors and configured to receive information from the detectors pertaining to light detected by the detectors from within the deformable transmissive layers. The computing system may be operatively coupled to one or more of the first illumination sources and is configured to control emissions from said one or more first illumination sources. At least one of the deformable transmissive layers may comprise an elastomeric material. The elastomeric material may be selected from the group consisting of: silicone, urethane, polyurethane, thermoplastic elastomer (TPE), and thermoplastic polyurethane (TPU). The at least one of the deformable transmissive layers may comprise a composite having a pigment material distributed within an elastomeric matrix, the pigment material configured to provide an illumination reflectance which is greater than that of the elastomer matrix. The pigment material may comprise a metal oxide. The at least one deformable transmissive layer may be bounded by a bottom surface directly coupled to the interface membrane, a top surface most adjacent the detector, and a transmissive layer thickness therebetween, wherein the pigment material is distributed adjacent the bottom surface within the transmissive layer thickness to provide optimized illumination reflectance adjacent the bottom surface. At least one of the interface membranes may comprise an elastomeric material. The interface member and deformable transmissive layer each may have an elastic modulus which is substantially the same. At least one coupling of deformable transmissive layer and interface membrane may be directly coupled such that both principal and shear loads applied by the interfaced object are substantially transferred across the interface membrane of the coupling to the deformable transmissive layer of the coupling. At least one of the deformable transmissive layers may comprise a bladder configured to be at least partially filled with a fluid. At least one of the interface membranes may comprise an assembly of relatively thin and sequentially removable membrane components.

Another embodiment is directed to a method for characterizing interfacial interaction with at least one aspect of an interfaced body portion of a user, comprising: providing a plurality of touch sensing assemblies and a computing system operatively coupled to each of the touch sensing assemblies, wherein each of the plurality comprises: a deformable transmissive layer coupled to an interface membrane, wherein the interface membrane is interfaced against the at least one aspect of the interfaced body portion; a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; and a detector configured to detect light from within at least a portion of the deformable transmissive layer; and utilizing the computing system to operate each of the detectors to detect at least a portion of light directed from each deformable transmissive layer, to determine surface orientations pertaining to positions along each interface membrane based at least in part upon interaction of the associated first illumination light with the associated deformable transmissive layers; wherein each of the plurality of touch sensing assemblies is configured to be interfaced against adjacent aspects of the interfaced body portion to generally address a surface of the interfaced body portion; and wherein the computing system is configured to utilize the determined surface orientations to characterize a geometric profile of the aggregated area of the interfaced body portion as interfaced against the plurality of interface membranes. The plurality of touch sensing assemblies may be maintained in a position and orientation urged against the body portion by one or more removable coupling members configured to couple the touch sensing assemblies relative to each other, and relative to the interfaced object. The one or more removable coupling members may be configured to orient the interface membranes of each touch sensing assembly in a substantially co-planar manner relative to a nearby portion of the surface of the body portion. The one or more removably coupling members may comprise a removably attachable flexible substrate layer. The removably attachable flexible substrate layer may be configured to at least partially encircle the interfaced object. The removably attachable flexible substrate layer may comprise a cuff configured to be coupled against a skin surface of the body portion of the user. The computing system may be operatively coupled to each of the touch sensing assemblies utilizing wired connectivity. The computing system may be operatively coupled to each of the touch sensing assemblies utilizing wireless connectivity. At least one of the first illumination sources may comprise a light emitting diode. At least one of the detectors may be a photodetector. At least one of the detectors is may be image capture device. The image capture device may be a CCD or CMOS device. The computing system may be operatively coupled to the detectors and configured to receive information from the detectors pertaining to light detected by the detectors from within the deformable transmissive layers. The computing system may be operatively coupled to one or more of the first illumination sources and is configured to control emissions from said one or more first illumination sources. At least one of the deformable transmissive layers may comprise an elastomeric material. The elastomeric material may be selected from the group consisting of: silicone, urethane, polyurethane, thermoplastic elastomer (TPE), and thermoplastic polyurethane (TPU). The at least one of the deformable transmissive layers may comprise a composite having a pigment material distributed within an elastomeric matrix, the pigment material configured to provide an illumination reflectance which is greater than that of the elastomer matrix. The pigment material may comprise a metal oxide.

The at least one deformable transmissive layer may be bounded by a bottom surface directly coupled to the interface membrane, a top surface most adjacent the detector, and a transmissive layer thickness therebetween, wherein the pigment material is distributed adjacent the bottom surface within the transmissive layer thickness to provide optimized illumination reflectance adjacent the bottom surface. At least one of the interface membranes may comprise an elastomeric material. The interface member and deformable transmissive layer each may have an elastic modulus which is substantially the same. At least one coupling of deformable transmissive layer and interface membrane may be directly coupled such that both principal and shear loads applied by the interfaced object are substantially transferred across the interface membrane of the coupling to the deformable transmissive layer of the coupling. At least one of the deformable transmissive layers may comprise a bladder configured to be at least partially filled with a fluid. At least one of the interface membranes may comprise an assembly of relatively thin and sequentially removable membrane components.

Another embodiment is directed to a method for predicting commands of a user by characterizing interfacial interaction with at least one aspect of an interfaced body portion of the user, comprising: providing a plurality of touch sensing assemblies, a secondary sensor, and a computing system operatively coupled to the secondary sensor and each of the touch sensing assemblies, wherein each of the plurality comprises: a deformable transmissive layer coupled to an interface membrane, wherein the interface membrane is interfaced against the at least one aspect of the interfaced body portion; a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; and a detector configured to detect light from within at least a portion of the deformable transmissive layer; configuring the secondary sensor to sense a secondary indicator of operation of the body portion and produce a secondary indicator output; and utilizing the computing system to operate each of the detectors to detect at least a portion of light directed from each deformable transmissive layer, to determine surface orientations pertaining to positions along each interface membrane based at least in part upon interaction of the associated first illumination light with the associated deformable transmissive layers, and to sense the secondary indicator of operation of the body portion using the secondary sensor; wherein each of the plurality of touch sensing assemblies is configured to be interfaced against adjacent aspects of the interfaced body portion to generally address a surface of the interfaced body portion; wherein the computing system is configured to utilize the determined surface orientations to characterize a geometric profile of the surface of the interfaced body portion as interfaced against the plurality of interface membranes; and wherein characterizing the geometric profile of the surface provides an output which is at least partially uncorrelated relative to the secondary indicator output, such that the computing system is further configured to assist in predicting commands of the user based at least in part upon both the secondary indicator output and the characterization of the geometric profile of the surface of the interfaced body portion. The secondary sensor may be selected from the group consisting of: a temperature sensor, a capacitive contact sensor, a resistive contact sensor, an electromyography electrode, a pressure transducer, an elongate sensor, and a inertial measurement unit. The secondary sensor may be an inertial measurement unit comprising at least one accelerometer and at least one gyro. The secondary sensor may be coupled to the body portion of the user. The secondary sensor may be coupled at least one of the one or more touch sensing assemblies. The secondary sensor may be coupled to an independent system which is coupled to the body portion. The secondary sensor may be coupled to a portable computing device which is coupled to the body portion. The secondary sensor may be coupled to the computing system by wired connectivity. The secondary sensor may be coupled to the computing system by wireless connectivity. The system may be configured to utilize the characterized geometric profile of the surface, along with secondary indicator output acceleration to predict commands of the user. Known modulus information pertaining to one or more of the touch sensing assemblies may be utilized to estimate interfacial forces applied between the body portion and the one or more touch sensing assemblies. The plurality of touch sensing assemblies may be maintained in a position and orientation urged against the body portion by one or more removable coupling members configured to couple the touch sensing assemblies relative to each other, and relative to the interfaced object. The one or more removable coupling members may be configured to orient the interface membranes of each touch sensing assembly in a substantially co-planar manner relative to a nearby portion of the surface of the body portion. The one or more removably coupling members may comprise a removably attachable flexible substrate layer. The removably attachable flexible substrate layer may be configured to at least partially encircle the interfaced object. The removably attachable flexible substrate layer may comprise a cuff configured to be coupled against a skin surface of the body portion of the user. The computing system may be operatively coupled to each of the touch sensing assemblies utilizing wired connectivity. The computing system may be operatively coupled to each of the touch sensing assemblies utilizing wireless connectivity. At least one of the first illumination sources may comprise a light emitting diode. At least one of the detectors may be a photodetector. At least one of the detectors may be an image capture device. The image capture device may be a CCD or CMOS device. The computing system may be operatively coupled to the detectors and configured to receive information from the detectors pertaining to light detected by the detectors from within the deformable transmissive layers. The computing system may be operatively coupled to one or more of the first illumination sources and is configured to control emissions from said one or more first illumination sources. At least one of the deformable transmissive layers may comprise an elastomeric material. The elastomeric material may be selected from the group consisting of: silicone, urethane, polyurethane, thermoplastic elastomer (TPE), and thermoplastic polyurethane (TPU). The at least one of the deformable transmissive layers may comprise a composite having a pigment material distributed within an elastomeric matrix, the pigment material configured to provide an illumination reflectance which is greater than that of the elastomer matrix. The pigment material may comprise a metal oxide. the at least one deformable transmissive layer may be bounded by a bottom surface directly coupled to the interface membrane, a top surface most adjacent the detector, and a transmissive layer thickness therebetween, wherein the pigment material is distributed adjacent the bottom surface within the transmissive layer thickness to provide optimized illumination reflectance adjacent the bottom surface. At least one of the interface membranes may comprise an elastomeric material. The interface member and deformable transmissive layer each may have an elastic modulus which is substantially the same. At least one coupling of deformable transmissive layer and interface membrane may be directly coupled such that both principal and shear loads applied by the interfaced object are substantially transferred across the interface membrane of the coupling to the deformable transmissive layer of the coupling. At least one of the the deformable transmissive layers may comprise a bladder configured to be at least partially filled with a fluid. At least one of the interface membranes may comprise an assembly of relatively thin and sequentially removable membrane components. The secondary sensor may be coupled to the plurality of touch sensing assemblies. The secondary sensor may be operatively coupled with but not co-located with the plurality of touch sensing assemblies.

Another embodiment is directed to a method for predicting commands of a user by characterizing interfacial interaction with at least one aspect of an interfaced body portion of the user, comprising: providing a plurality of touch sensing assemblies, a secondary sensor, and a computing system operatively coupled to the secondary sensor and each of the touch sensing assemblies, wherein each of the plurality comprises: a deformable transmissive layer coupled to an interface membrane, wherein the interface membrane is interfaced against the at least one aspect of the interfaced body portion; a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; and a detector configured to detect light from within at least a portion of the deformable transmissive layer; configuring the secondary sensor to sense a secondary indicator of operation of the body portion and produce a secondary indicator output; and utilizing the computing system to operate each of the detectors to detect at least a portion of light directed from each deformable transmissive layer, to determine surface orientations pertaining to positions along each interface membrane based at least in part upon interaction of the associated first illumination light with the associated deformable transmissive layers, and to sense the secondary indicator of operation of the body portion using the secondary sensor; wherein each of the plurality of touch sensing assemblies is configured to be interfaced against adjacent aspects of the interfaced body portion to generally address a surface of the interfaced body portion; wherein the computing system is configured to utilize the determined surface orientations to characterize a geometric profile of the surface of the interfaced body portion as interfaced against the plurality of interface membranes; and wherein the computing system is further configured to assist in predicting commands of the user based at least in part upon both the secondary indicator output and the characterization of the geometric profile of the surface as analyzed at runtime utilizing a neural network computing configuration trained using a library of prior operation data. The neural network computing configuration may be trained utilizing a library of prior operation data based upon similar combinations of touch sensing assemblies and interfaced body portions for a plurality of different users. The neural network computing configuration may be trained utilizing a library of prior operation data based upon similar combinations of touch sensing assemblies and interfaced body portions for a plurality of different prior sessions with the same user. The neural network computing configuration may be trained based upon a supervised learning model wherein a training library comprising a relatively large number predetermined relationships between characterized surface profiles, secondary sensor outputs, and intended user commands is utilized to develop correlations. The neural network computing configuration may be trained based upon a reinforcement learning model wherein a training library comprising a relatively large number predetermined relationships between characterized surface profiles, secondary sensor outputs, intended user commands, and intended user objectives is utilized to develop correlations. The secondary sensor may be selected from the group consisting of: a temperature sensor, a capacitive contact sensor, a resistive contact sensor, an electromyography electrode, a pressure transducer, an elongate sensor, a moisture sensor, and an inertial measurement unit (IMU). The secondary sensor may be an inertial measurement unit comprising at least one accelerometer and at least one gyro. The secondary sensor may be coupled to the body portion of the user. The secondary sensor may be coupled at least one of the one or more touch sensing assemblies. The secondary sensor may be coupled to an independent system which is coupled to the body portion. The secondary sensor may be coupled to a portable computing device which is coupled to the body portion. The secondary sensor may be coupled to the computing system by wired connectivity. The secondary sensor may be coupled to the computing system by wireless connectivity. The system may be configured to utilize the characterized geometric profile of the surface, along with secondary indicator output acceleration to predict commands of the user. Known modulus information pertaining to one or more of the touch sensing assemblies may be utilized to estimate interfacial forces applied between the body portion and the one or more touch sensing assemblies. The plurality of touch sensing assemblies may be maintained in a position and orientation urged against the body portion by one or more removable coupling members configured to couple the touch sensing assemblies relative to each other, and relative to the interfaced object. The one or more removable coupling members may be configured to orient the interface membranes of each touch sensing assembly in a substantially co-planar manner relative to a nearby portion of the surface of the body portion. The one or more removably coupling members may comprise a removably attachable flexible substrate layer. The removably attachable flexible substrate layer may be configured to at least partially encircle the interfaced object. The removably attachable flexible substrate layer may comprise a cuff configured to be coupled against a skin surface of the body portion of the user. The computing system may be operatively coupled to each of the touch sensing assemblies utilizing wired connectivity. The computing system may be operatively coupled to each of the touch sensing assemblies utilizing wireless connectivity. At least one of the first illumination sources may comprise a light emitting diode. At least one of the detectors may be a photodetector. At least one of the detectors may be an image capture device. The image capture device may be a CCD or CMOS device. The computing system may be operatively coupled to the detectors and configured to receive information from the detectors pertaining to light detected by the detectors from within the deformable transmissive layers. The computing system may be operatively coupled to one or more of the first illumination sources and is configured to control emissions from said one or more first illumination sources. At least one of the deformable transmissive layers may comprise an elastomeric material. The elastomeric material may be selected from the group consisting of: silicone, urethane, polyurethane, thermoplastic elastomer (TPE), and thermoplastic polyurethane (TPU). The at least one of the deformable transmissive layers may comprise a composite having a pigment material distributed within an elastomeric matrix, the pigment material configured to provide an illumination reflectance which is greater than that of the elastomer matrix. The pigment material may comprise a metal oxide. The at least one deformable transmissive layer may be bounded by a bottom surface directly coupled to the interface membrane, a top surface most adjacent the detector, and a transmissive layer thickness therebetween, wherein the pigment material is distributed adjacent the bottom surface within the transmissive layer thickness to provide optimized illumination reflectance adjacent the bottom surface. At least one of the interface membranes may comprise an elastomeric material. The interface member and deformable transmissive layer each may have an elastic modulus which is substantially the same. At least one coupling of deformable transmissive layer and interface membrane may be directly coupled such that both principal and shear loads applied by the interfaced object are substantially transferred across the interface membrane of the coupling to the deformable transmissive layer of the coupling. At least one of the the deformable transmissive layers may comprise a bladder configured to be at least partially filled with a fluid. At least one of the interface membranes may comprise an assembly of relatively thin and sequentially removable membrane components. The secondary sensor may be coupled to the plurality of touch sensing assemblies. The secondary sensor may be operatively coupled with but not co-located with the plurality of touch sensing assemblies.

DETAILED DESCRIPTION

Figure 1:
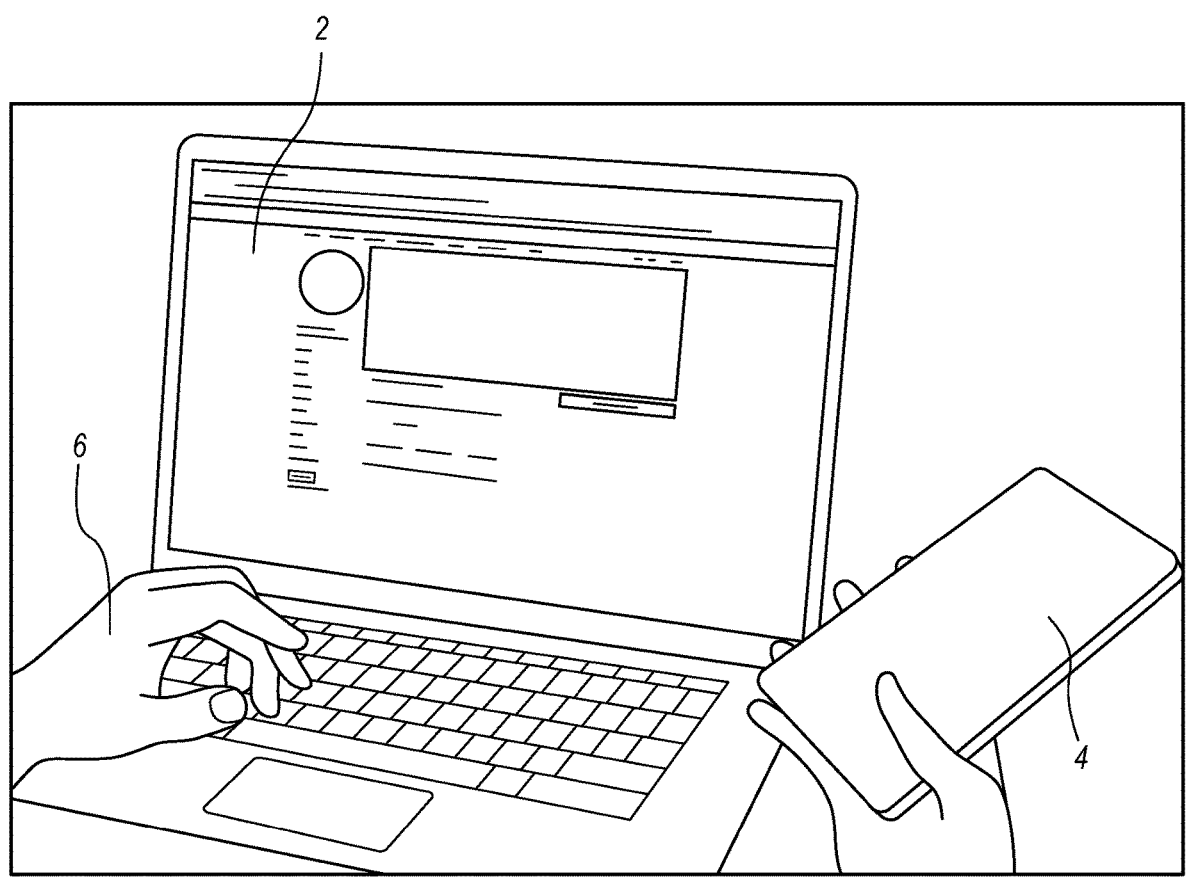
FIGS. 1, 2A, and 2B illustrate aspects of conventional computing systems.
Figure 2A:
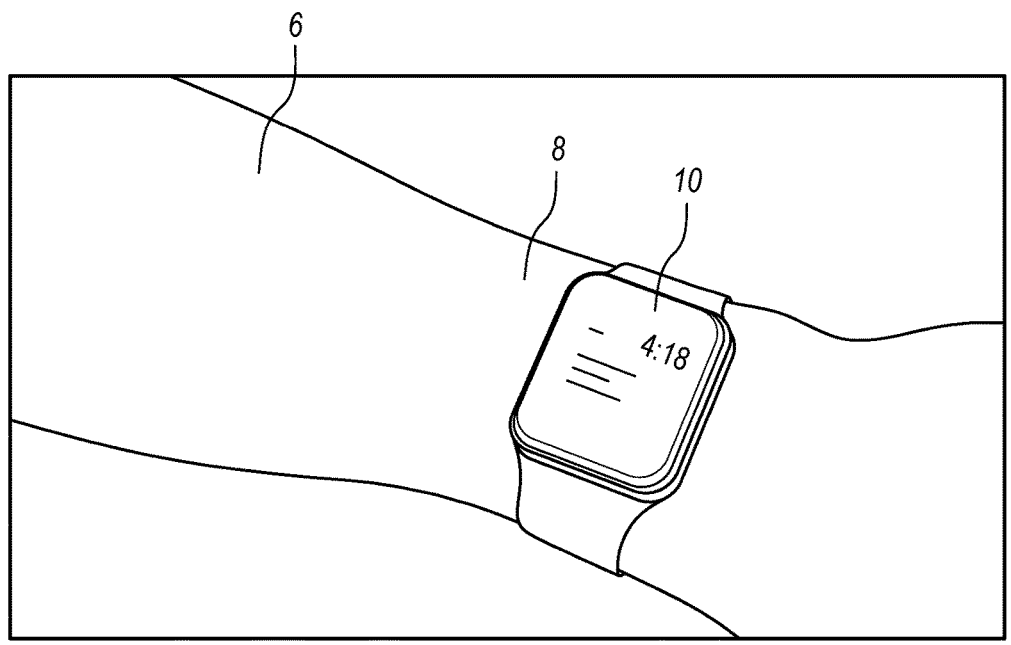
Figure 2B:
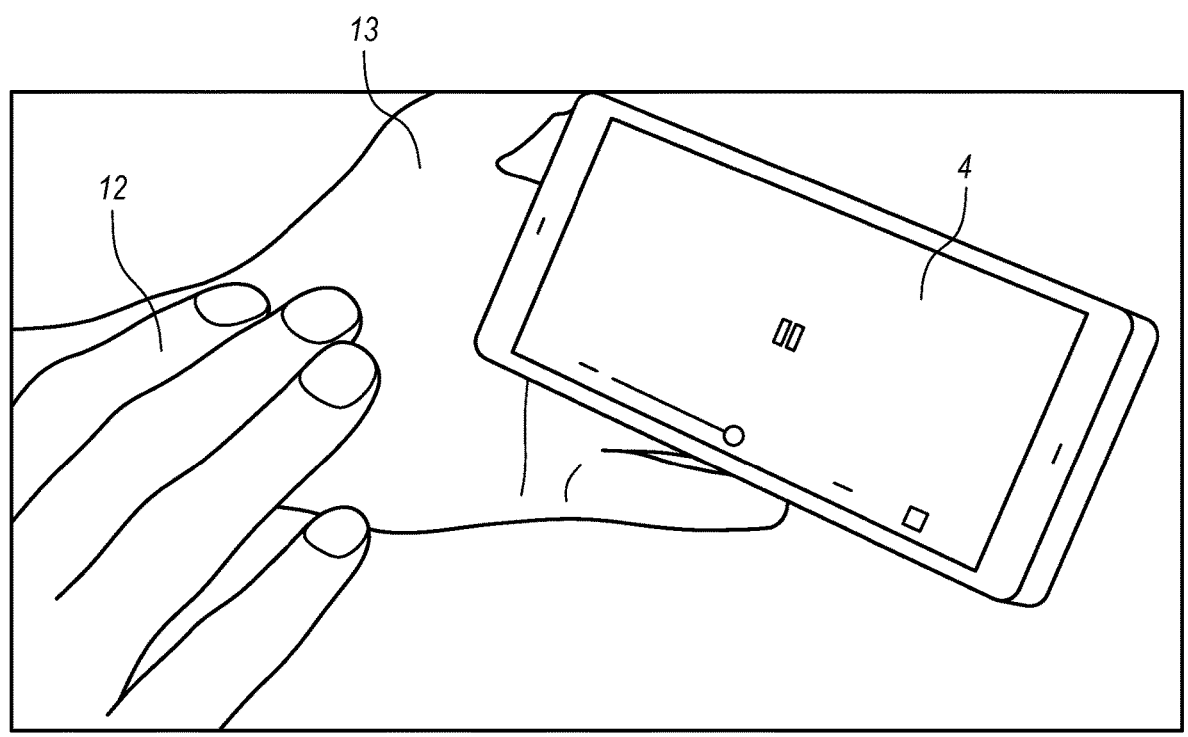
Figure 3A:
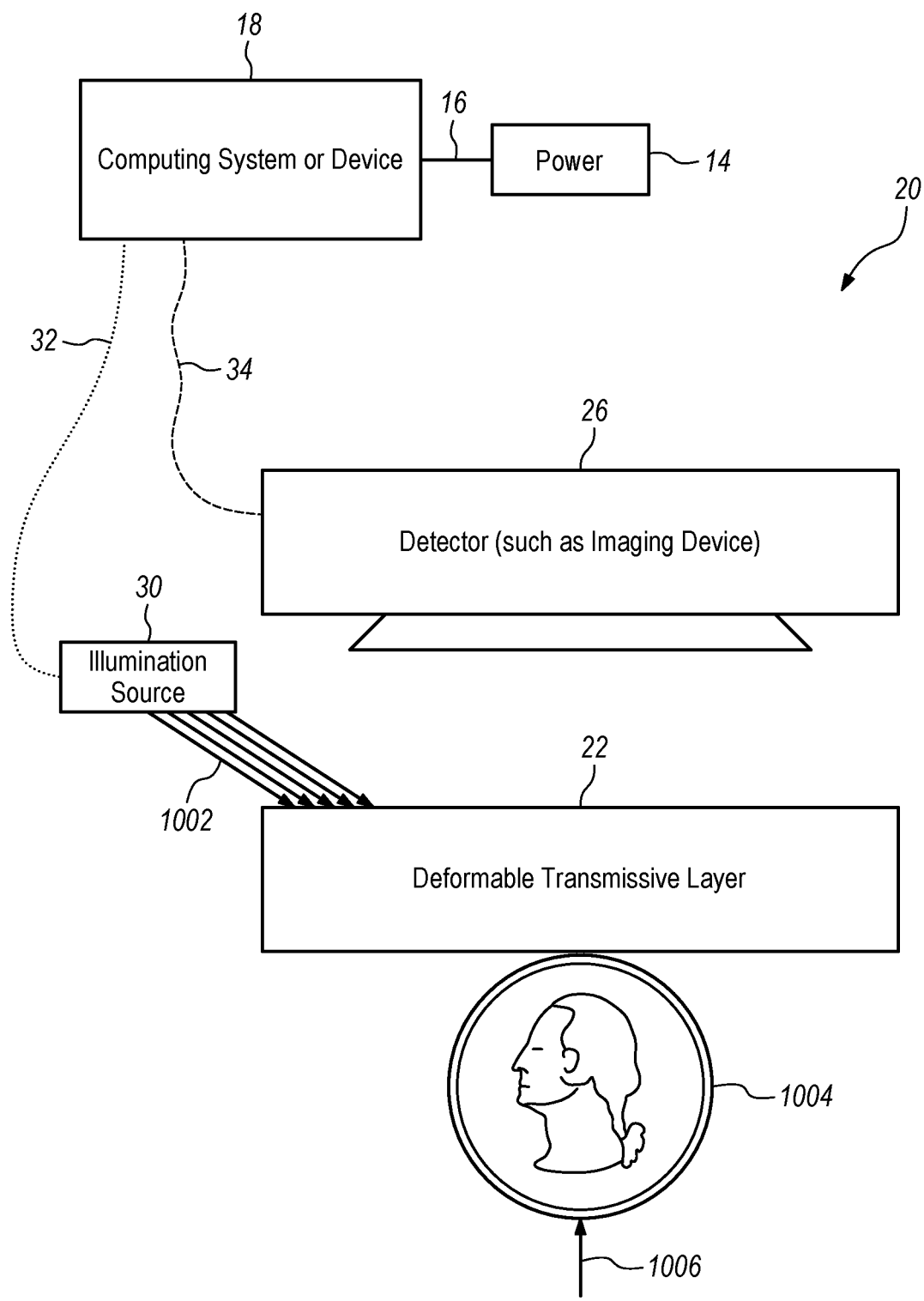
FIGS. 3A-3D illustrate various aspects of systems for characterizing an interaction between surfaces featuring a deformable transmissive layer.
Figure 3B:
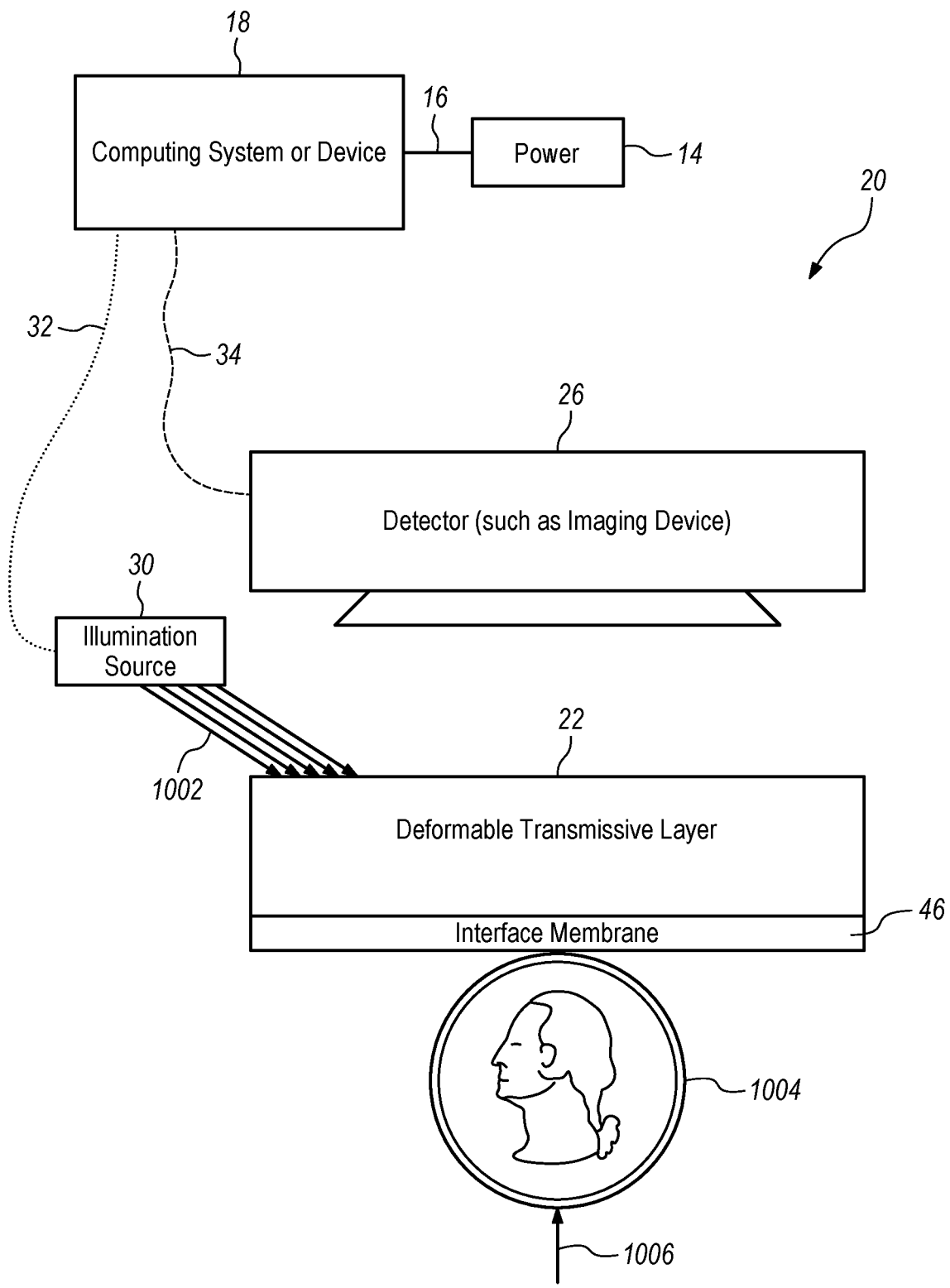
Figure 3C:
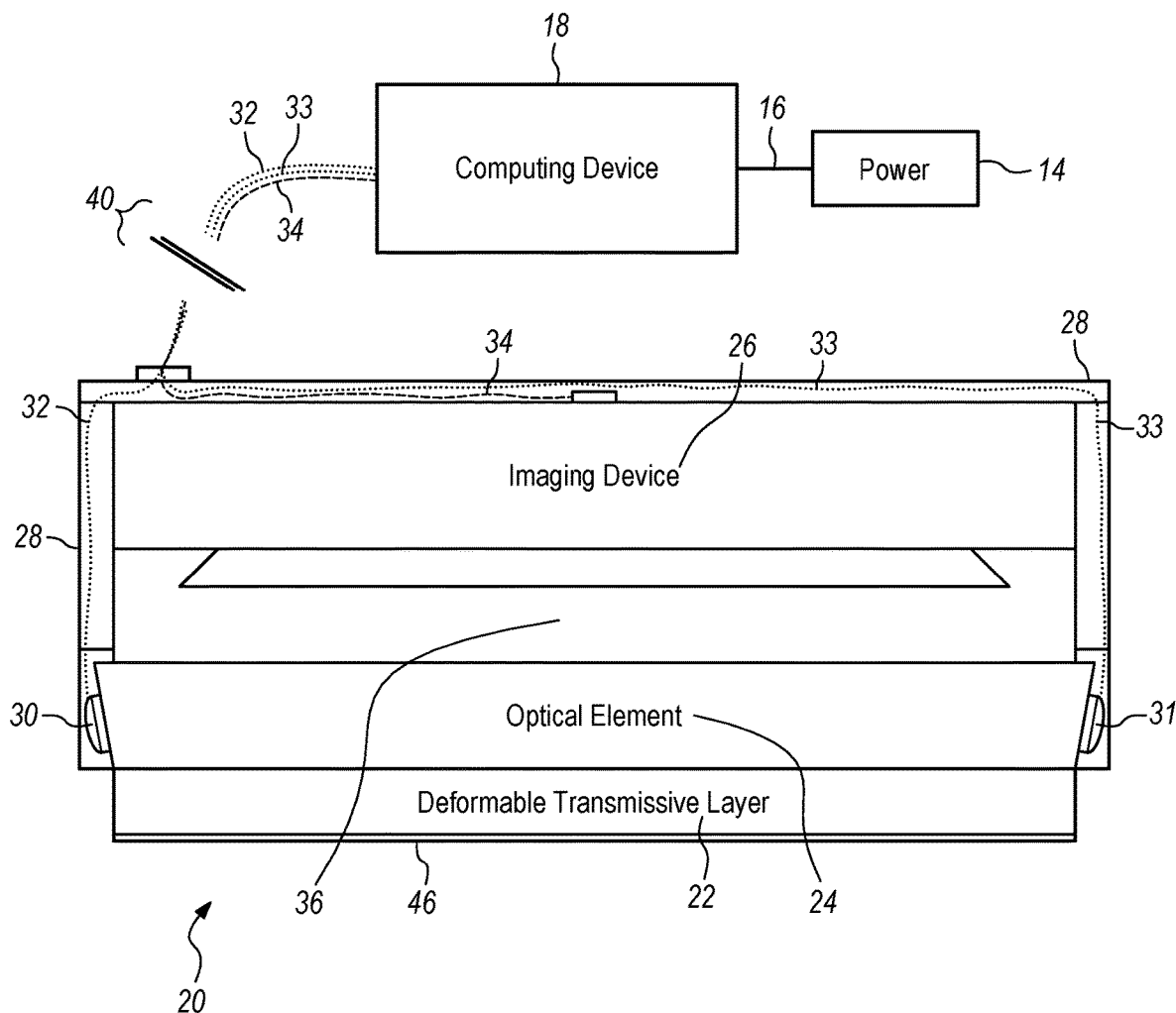

Referring to FIGS. 3A-3D, various aspects of digital touch sensing assembly (20) configurations illustrated featuring an a deformable transmissive layer (22) which may be utilized to characterize interaction between surfaces. For example, referring to FIG. 3A, in a simplified illustrative embodiment, a computing system or device (18) operatively coupled (16) to a power supply (14) may be utilized to control, through a control coupling (32) which may be wired or wireless, light (1002) or other emissions from an illumination source (30) which may be directed into a deformable transmissive layer (22). The deformable transmissive layer (22) may be urged (1006) against at least a portion of an interfaced object (1004), such as the edge of a coin, and based upon the interaction of the illumination (1002) with the deformable transmissive layer (22), a detector, such as an image capture device (such as a CCD or CMOS device), which may be operatively coupled (34, such as by wired or wireless connectivity) to the computing system (18) may be configured to detect at least a portion of light directed from the deformable transmissive layer. In other words, with the illumination source (30) operatively coupled (such as optically coupled with an efficient transmission interface) to pass illumination at a known orientation relative to the deformable transmissive layer such that at least a portion of the illumination light interacts with the deformable transmissive layer, and the detector configured to detect light from within at least a portion of the deformable transmissive layer, the computing system may be configured to operate the detector to detect at least a portion of light directed from the deformable transmissive layer, to determine surface orientations pertaining to positions along the interface of the deformable transmissive layer with the interfaced object based at least in part upon interaction of the first illumination light with the deformable transmissive layer, and to utilize the determined surface orientations to characterize a geometric profile of the at least one aspect of the interfaced object as interfaced against the interface membrane. Referring to FIG. 3B, as discussed further below, an interface membrane (46) may be interposed between the interfaced object (1004) and the deformable transmissive layer (22); such interface membrane may have a modulus that is similar to or different from that of the deformable transmissive layer. Preferable an efficient coupling is created between the deformable transmissive layer and the membrane, such that shear, and principal or normal loads are efficiently transferred between these structures. Referring to FIG. 3C, an embodiment is illustrated wherein an optical element (24) is included, and which may be configured to assist in the precise distribution of light or other radiation throughout the various portions of the assembled system. The optical element may comprise a substantially rigid material which is highly transmissive; it may comprise a top surface, bottom surface, and sides defined therebetween, to form three dimensional shapes such as cylinders, cuboids, and/or rectangular prismic shapes, for example. The depicted optical element (24) may be illuminated by one of more intercoupled light sources (30, 31) and positioned within a field of view of an imaging device (26). A housing (28) is configured to retain positioning of the components relative to each other, and an interface membrane (46), as noted above, which may comprise a fixedly attached or removably coupled substantially thin layer comprising a relatively low bulk modulus polymeric material, for example, and which may be positioned for direct contact between other objects and the digital touch sensing assembly (20) for touch determination and characterization. Preferably the deformable transmissive layer and/or interface membrane comprises an elastomeric material, such as silicone, urethane, polyurethane, thermoplastic polyurethane (TPU), or thermoplastic elastomer (TPE). Other elastomers with less light and/or radiation transmission efficiency may also be utilized, such as natural rubbers, neoprene, ethylene propylene diene monomer (EPDM) rubber, butyl rubber, nitrile rubber, styrene-butadiene rubber (SBR), Viton, fluorosilicone, & polyacrylate. The deformable transmissive layer may comprise a composite having a pigment material, such as a metal oxide (such as, for example, iron oxide, zinc oxide, aluminum oxide, and/or titanium dioxide), metal nanoparticle (such as silver nanoparticles and/or aluminum nanoparticles), or other molecules configured to differentially interact with introduced light or radiation, such as dyes, distributed within an elastomeric matrix. A pigment material may be configured to provide an illumination reflectance which is greater than that of the elastomer matrix. The deformable transmissive layer is bounded by a bottom surface directly coupled to the interface membrane, a top surface most adjacent the detector, and a transmissive layer thickness therebetween, wherein the pigment material is distributed adjacent the bottom surface within the transmissive layer thickness to provide optimized illumination reflectance adjacent the bottom surface. Aspects of suitable digital touch sensing assembly (20) configurations generally featuring elastomeric deformable transmissive layer materials are described, for example, in U.S. Pat. Nos. 10,965,854, 9,127,938, and 8,411,140, each of which is incorporated by reference herein in its entirety. As shown in FIG. 3C, the depicted digital touch sensing assembly (20) may feature a gap or void (36), which may contain an optically transmissive material (such as one that has a refractive index similar to that of the optical element 24), air, or a specialized gas, such as an inert gas, geometrically configured to place aspects of the optical element (24) and/or deformable transmissive layer (22) within a desired proximity of the imaging device (26), which may comprise an imaging sensor such as a digital camera chip, single light sensing element (such as a photodiode), or an array of light sensing elements, and which may be configured to have a field of view and depth of field that is facilitated by the geometric gap or void (36). In another embodiment, the optical element (24) may be configured to be deformable or conformable such that impacts of the rigidity of such structure upon other associated elements is minimized.

Also shown in FIG. 3C is a computing device or system (18) which may comprise a computer, microcontroller, field programmable gate array, application specific integrated circuit, or the like, which is configured to be operatively coupled to the imaging device (26), and also to the one or more light sources (30), to facilitate control of these devices in gathering data pertaining to touch against the deformable transmissive layer (22). For example, in one embodiment, each of the light sources (30, 31) comprises a light emitting diode ("LED") operatively coupled (32, 33) to the computing device (18) using an electronic lead, and the imaging device (26) comprises a digital camera sensor chip operatively coupled to the computing device using an electronic lead (34), as shown in FIG. 3C. A power source (14) may be operatively coupled to the computing device (18) to provide power to the computing the device (18), and also may be configured to controllably provide power to interconnected devices such as the imaging device (26) and light sources (30, 31), through their couplings (34, 32, 33, respectively). As shown in FIG. 3C (40), these coupling interfaces (32, 33, 34) may be short or relatively long (i.e., the digital touch sensing assembly 20 may be in a remote location relative to the computing device 18), and may be direct physical connections or transmissions of data through wired or wireless interfaces, such as via light/optical networking protocols, or wireless networking protocols such as Bluetooth (RTM) or 802.11 based configurations, which may be facilitated by additional computing and power resources local to the digital touch sensing assembly (20).

Figure 3D:
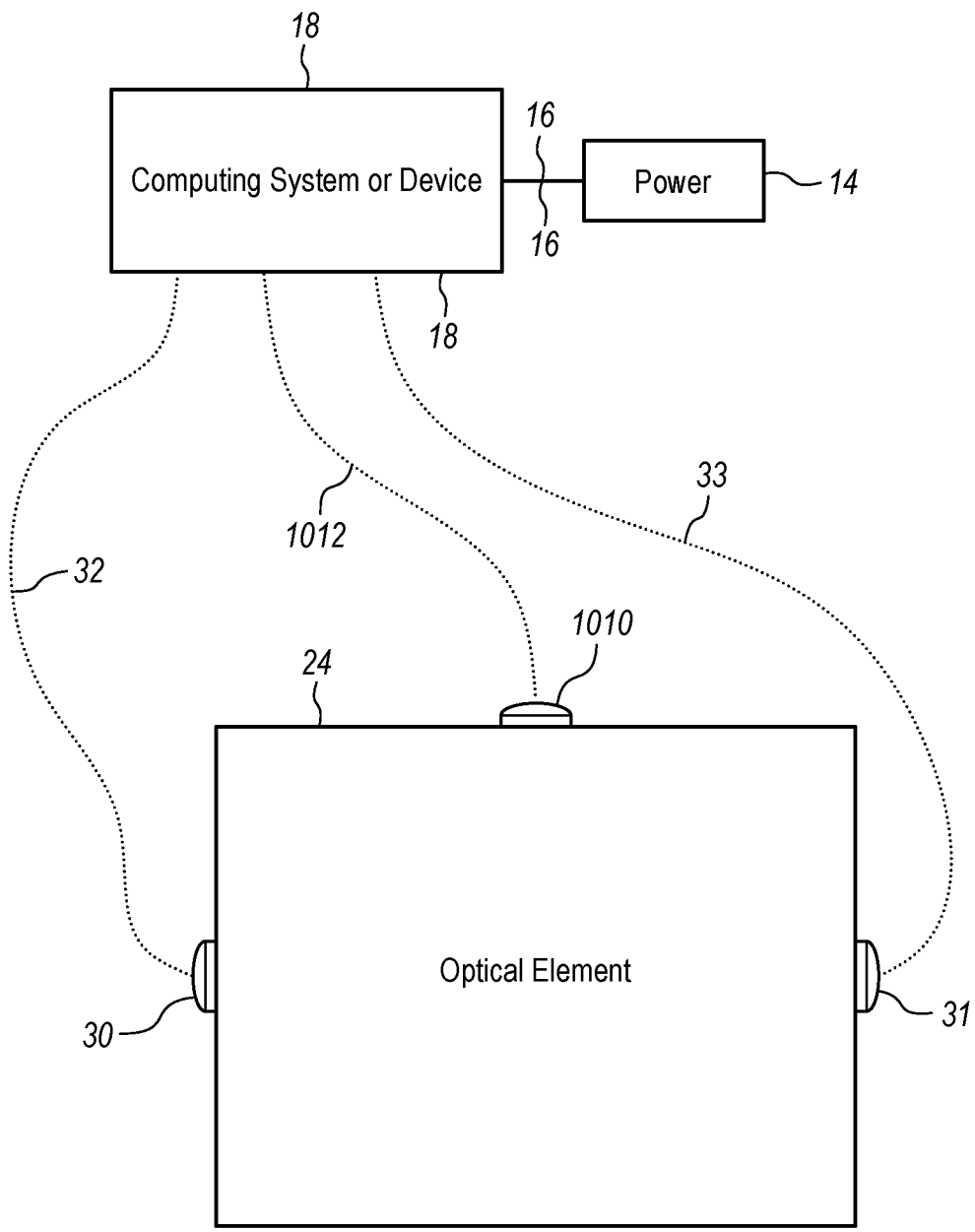

Referring to FIG. 3D, a partial schematic view illustrates that a computing system (18) may be operatively coupled (32, 33, 1012), such as via wired or wireless control leads, two three different illumination sources (30, 31, 1010), or more; these illumination sources may be configured to have different wavelengths of emissions, and/or different polarization, and as depicted, may be configured to emit from different orientations relative to the optical element (24) and associated deformable transmissive layer (22) to allow for further data pertaining to the geometric profiling.

Figure 4:
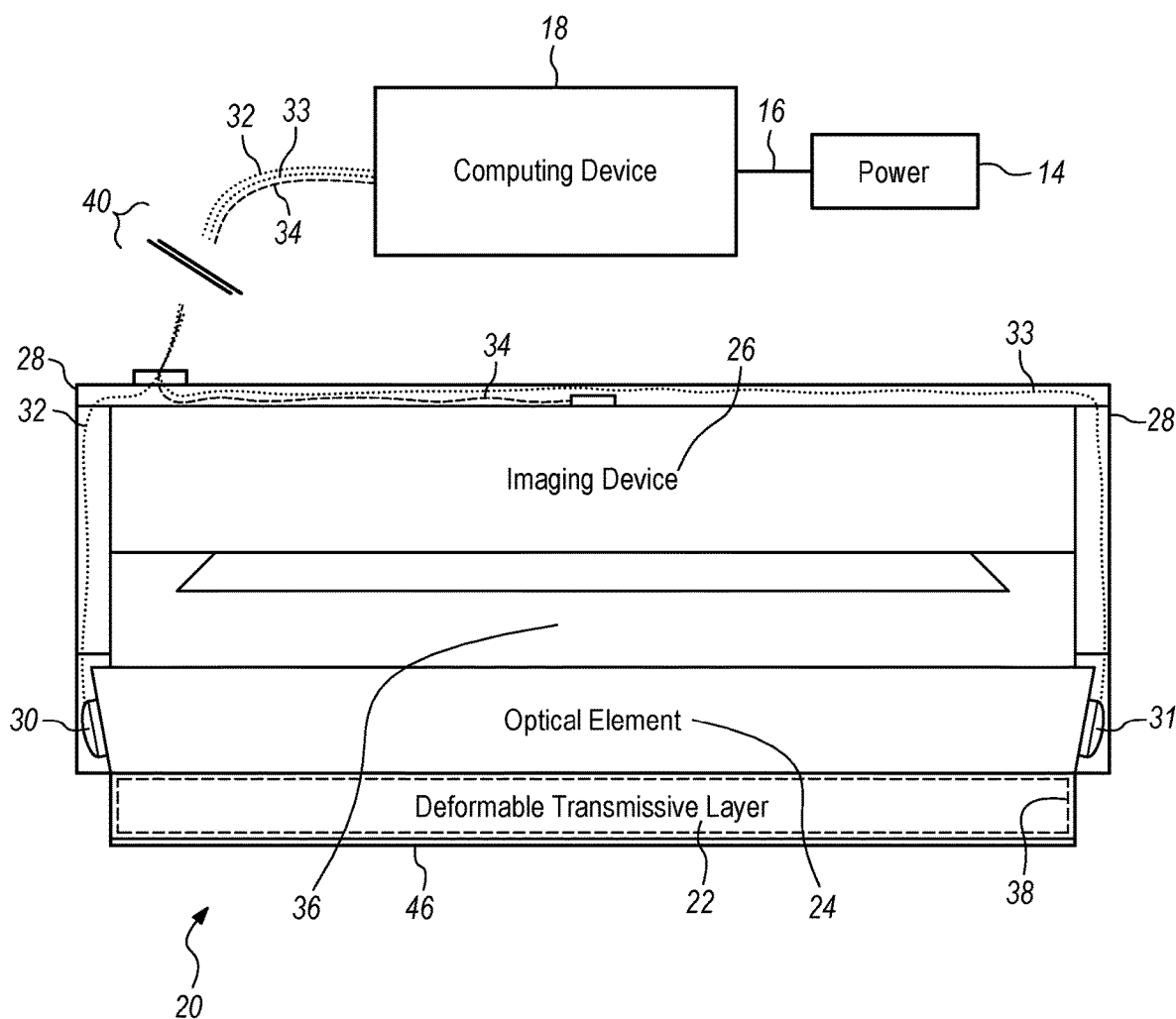
FIGS. 4-5, 6A-B, and 7 illustrate various aspects of systems for characterizing an interaction between surfaces featuring a deformable transmissive layer.

Referring to FIG. 4, a configuration similar to that shown in FIG. 3C is illustrated, with the exception that the deformable transmissive layer (22) of FIG. 4 comprises one or more bladders or enclosed volumes (38) which may be occupied, for example, by a gas or fluid. In one embodiment, for example, the deformable transmissive layer (22) may comprise several separately-controllable inflatable segments or sub-volumes, and may comprise a cross-sectional shape selected to provide specific mechanical performance under loading, such as a controllable honeycomb type cross-sectional shape configuration. As noted above, a deformable transmissive layer (22) may comprise a material or materials selected to match the touch sensing paradigm in terms of bulk and/or Young's Modulus. In other words, for sensing relatively low loads, such as in a digital touch scenario of interfacing with soap bubbles or a surface of a live photosynthesizing leaf of a plant, a relatively low modulus (i.e., generally locally flexible/deformable; not stiff) material such as an elastomer, as described, for example, in the aforementioned incorporated references, may be utilized for the deformable transmissive layer (22) and or outer interface membrane (46), which, as noted above, may be removable. The outer interface membrane (46) may comprise an assembly of relatively thin and sequentially removable membranes, such that they may be sequentially removed when they become coupled to dirt or dust, for example, in a "tear-off" type fashion. With an embodiment such as that shown in FIG. 4 wherein the deformable transmissive layer (22) comprises an at least temporarily captured volume of liquid or gas, the gas or liquid, along with the pressure thereof, may be modulated to address the desired bulk modulus and sensitivity of the overall deformable transmissive layer (22) (for example, the pressure and/or volume may be modulated pertaining to the one or more bladder segments 38) to generally change the functional modulus of the deformable transmissive layer 22).

Figure 5:
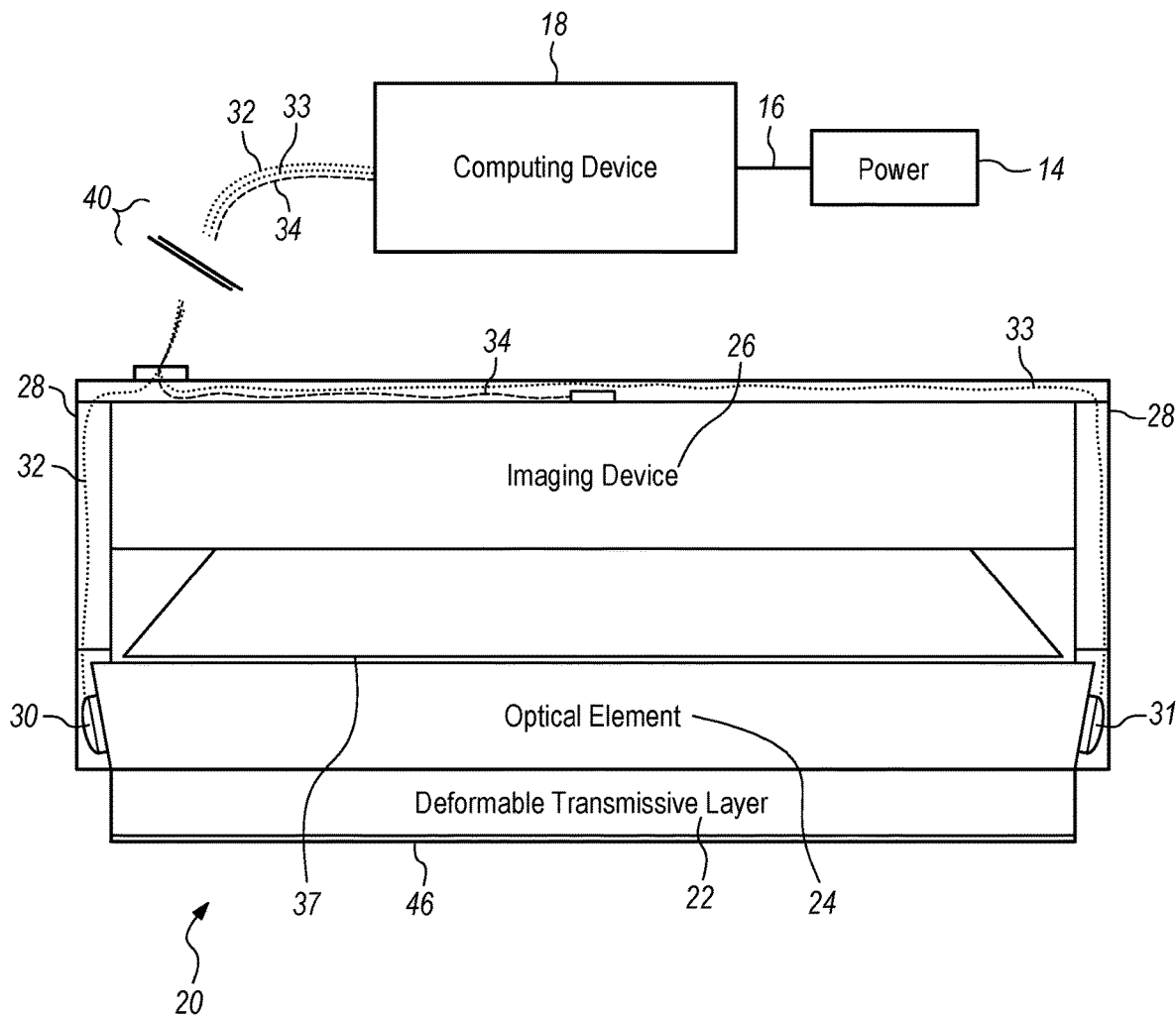

Referring to FIG. 5, a configuration similar to that of FIG. 3C is illustrated, wherein the configuration of FIG. 5 illustrates that the gap (37) between the imaging device (26) and optical element (24) can be reduced and even eliminated, depending upon the optical layout of the imaging device (26), which may be intercoupled with refractive and/or diffractive optics to change properties such as focal distance of the imaging device (26).

Figure 6A:
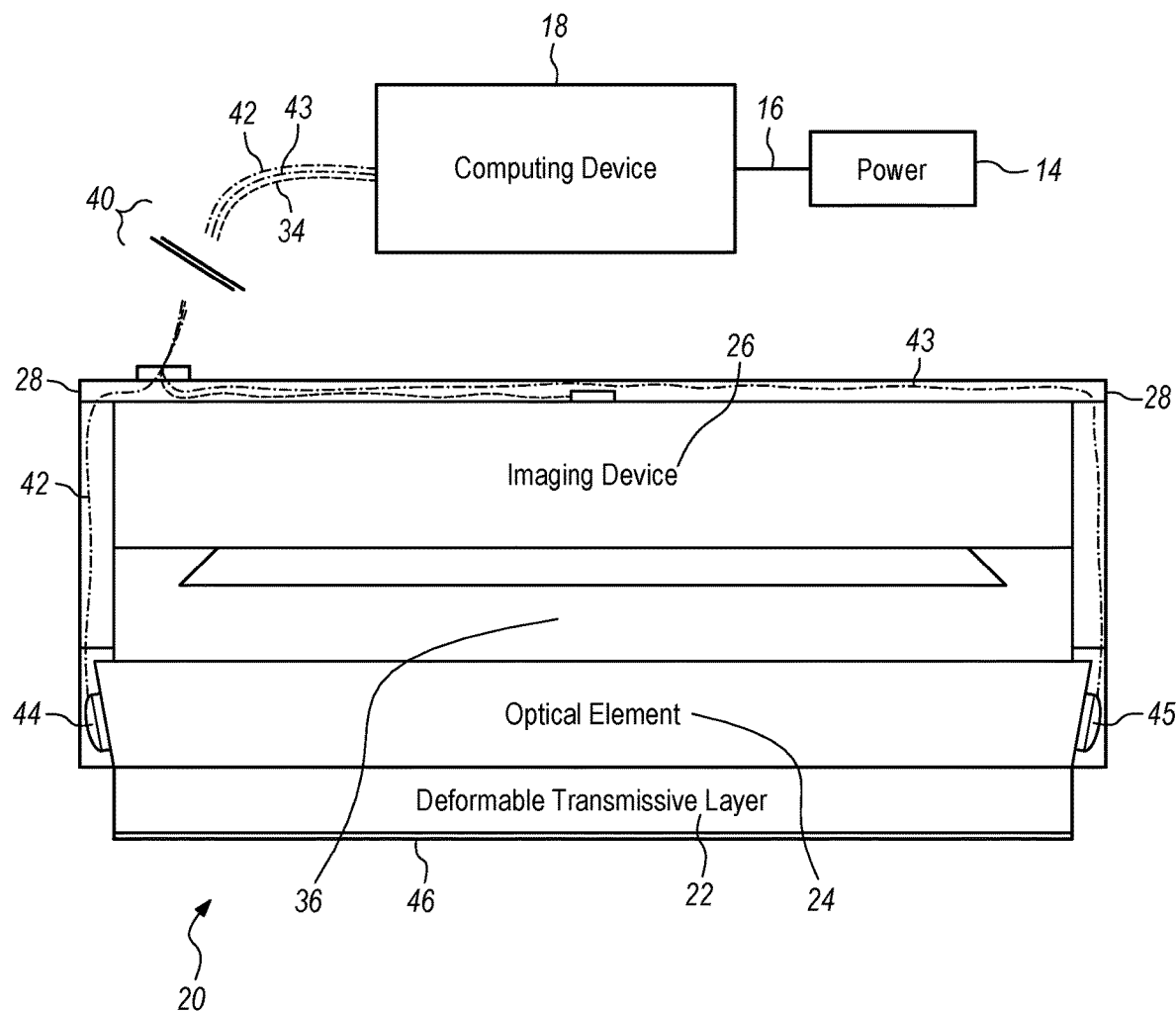

Referring to FIG. 6A, a configuration similar to that of FIG. 3C is illustrated, with exception that the configuration of FIG. 6A illustrates that the one or more light sources may be more akin to light emitters (44, 45) which are configured to emit light that originates at another location, such as coupled to one more light LED light sources which are directly coupled to the computing device (18) and configured to transmit light through a light-transmitting coupling member (42, 43) via a light fiber, "light pipe", or waveguide which may be configured to pass photons, such as via total internal reflection, as efficiently as possible from such sources to the emitters (44, 45).

Figure 6B:
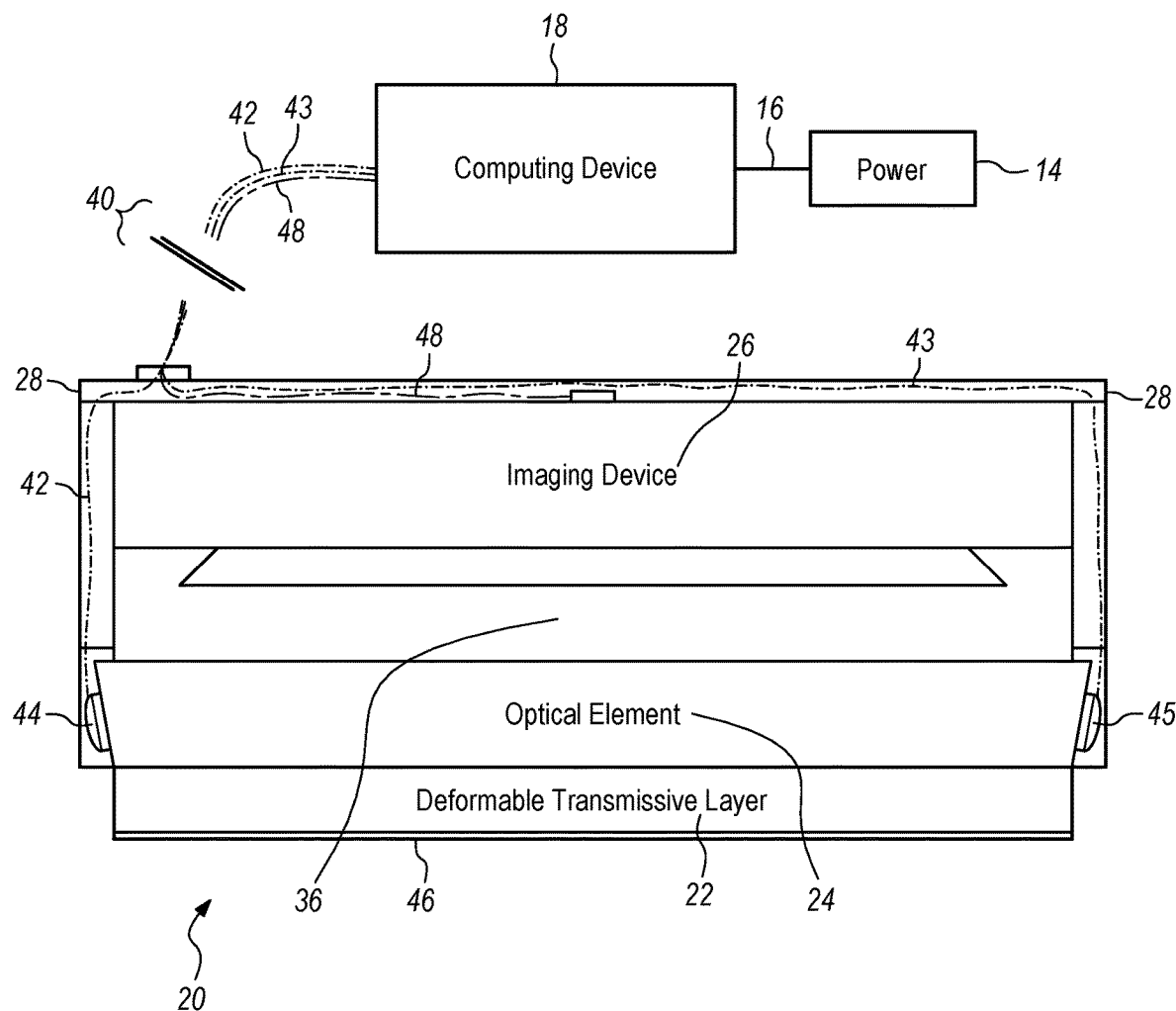

Similarly, referring to FIG. 6B, a configuration similar to that of FIG. 6A is illustrated, wherein the imaging device comprises capturing optics selected to gather photons and transmit them back through a light-transmissive coupling member (48), such as a waveguide or one or more light fibers, to an image sensor which may be positioned within or coupled to the computing device (18) or other structure which may reside separately from the digital touch sensing assembly (20).

Figure 7:
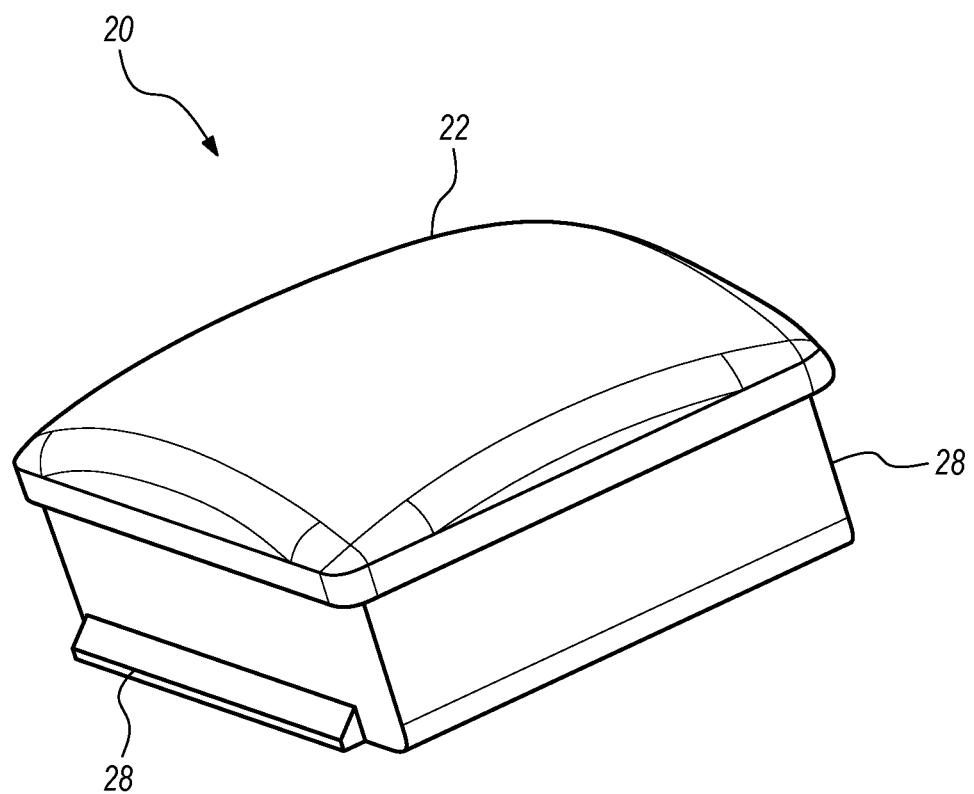

Referring to FIG. 7, as noted in the aforementioned incorporated reference (U.S. Pat. No. 10,965,854), a deformable transmissive layer or member (22) may comprise various geometries and need not be planar or rectangular-prismic; for example, a deformable transmissive layer or member (22) may be curved, convex, saddle-shaped, and the like and may be customized for various particular contact sensing scenarios. For example, a plurality of convex-shaped assemblies (20) such as that shown in FIG. 7 may be coupled to a gripping interface of a robotic gripper/hand, to facilitate touch sensing/determination pertaining to items being grasped in a manner akin to the paradigm of the skin segments between the joints of a human hand that is grasping an object.

Figure 8A:
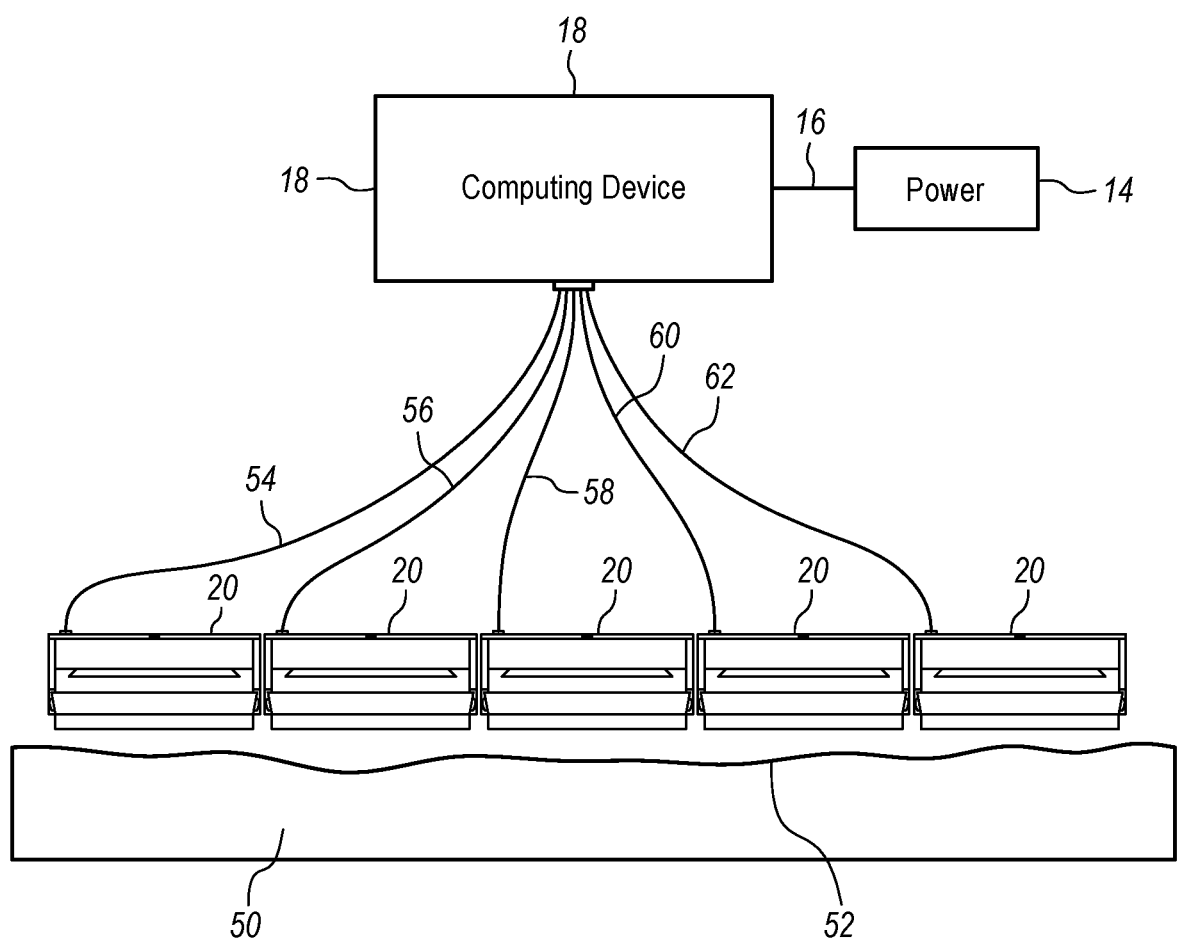
FIGS. 8A-D, 9A-D, 10A-B, 11A-B, and 12-13 illustrate various aspects of systems for characterizing an interaction between surfaces featuring a plurality of deformable transmissive layers aggregated for enhanced characterization capabilities

Referring to FIG. 8A, a plurality of digital touch sensing assemblies (20) may be utilized together to sense a larger surface (52) of an object (50). Each of such assemblies (20, five are illustrated in FIG. 8A) may be operatively coupled, such as via electronic lead (and may be interrupted by wireless connectivity, for example, as noted above), to one or more computing devices (18) as illustrated (54, 56, 58, 60, 62), and may therefore be configured to exchange data, and facilitate transmission of power, light, and control and sensing information.

Figure 8B:
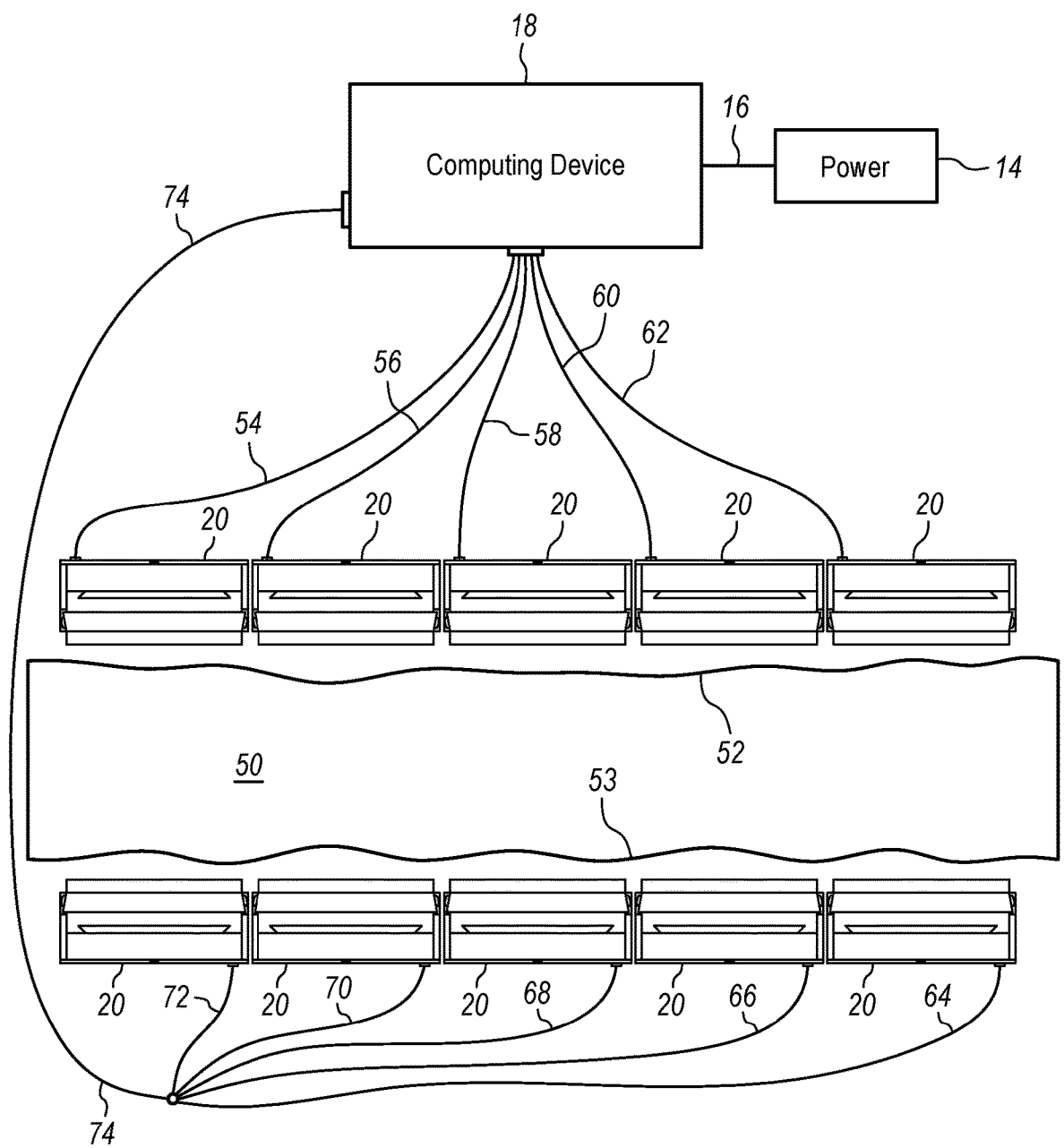

Referring to FIG. 8B, a larger plurality, relative to that of FIG. 8A, may be utilized to partially or completely surround an object (50), or to monitor digital touch with two or more surfaces (52, 53) of such object (50). The five additional digital touch sensing assemblies (20) depicted at the bottom of FIG. 8B may be operatively coupled to the same, or a different, computing device (18), and coupling leads (such as 64, 66, 68, 70, 72) may be combined or coupled to form a single combined coupling lead assembly (74), as shown in FIG. 8B.

Figure 8C:
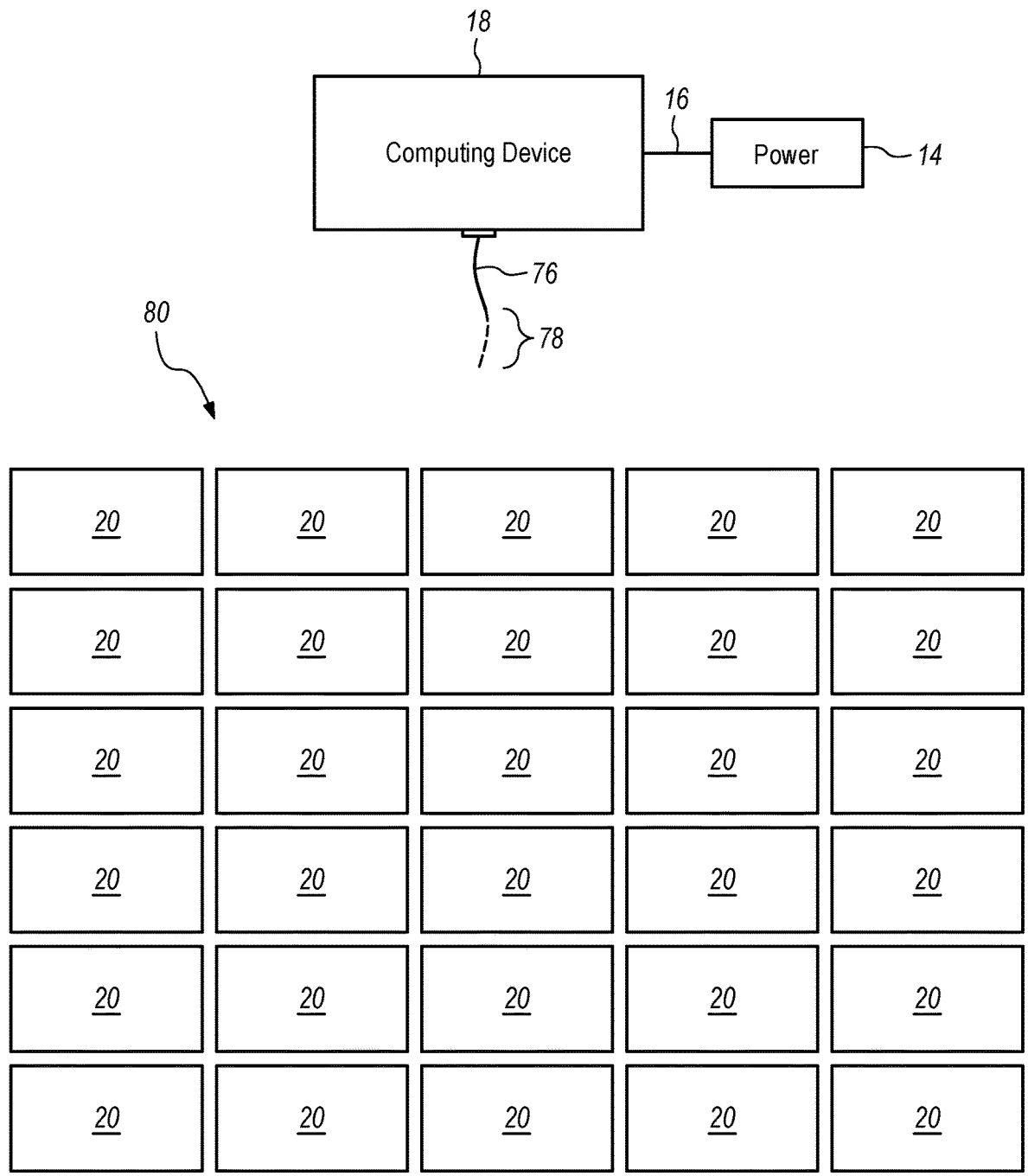

Referring to FIG. 8C, a plurality of digital touch sensing assemblies (20) may be assembled, such as in an array configuration (80), to facilitate sensing of an area or surface, and each of the digital touch sensing assemblies (20) of the array (80) may be operatively coupled (76, 78), such as via a plurality of coupling leads which may be wirelessly interrupted, as noted above, to one of more computing devices (18). For illustrative purposes, FIGS. 8D, 9A, 9B, 9C, 12, and 13 comprise arrays (80) of digital touch sensing assemblies (20) integrated into various configurations for various exemplary use cases.

Figure 8D:
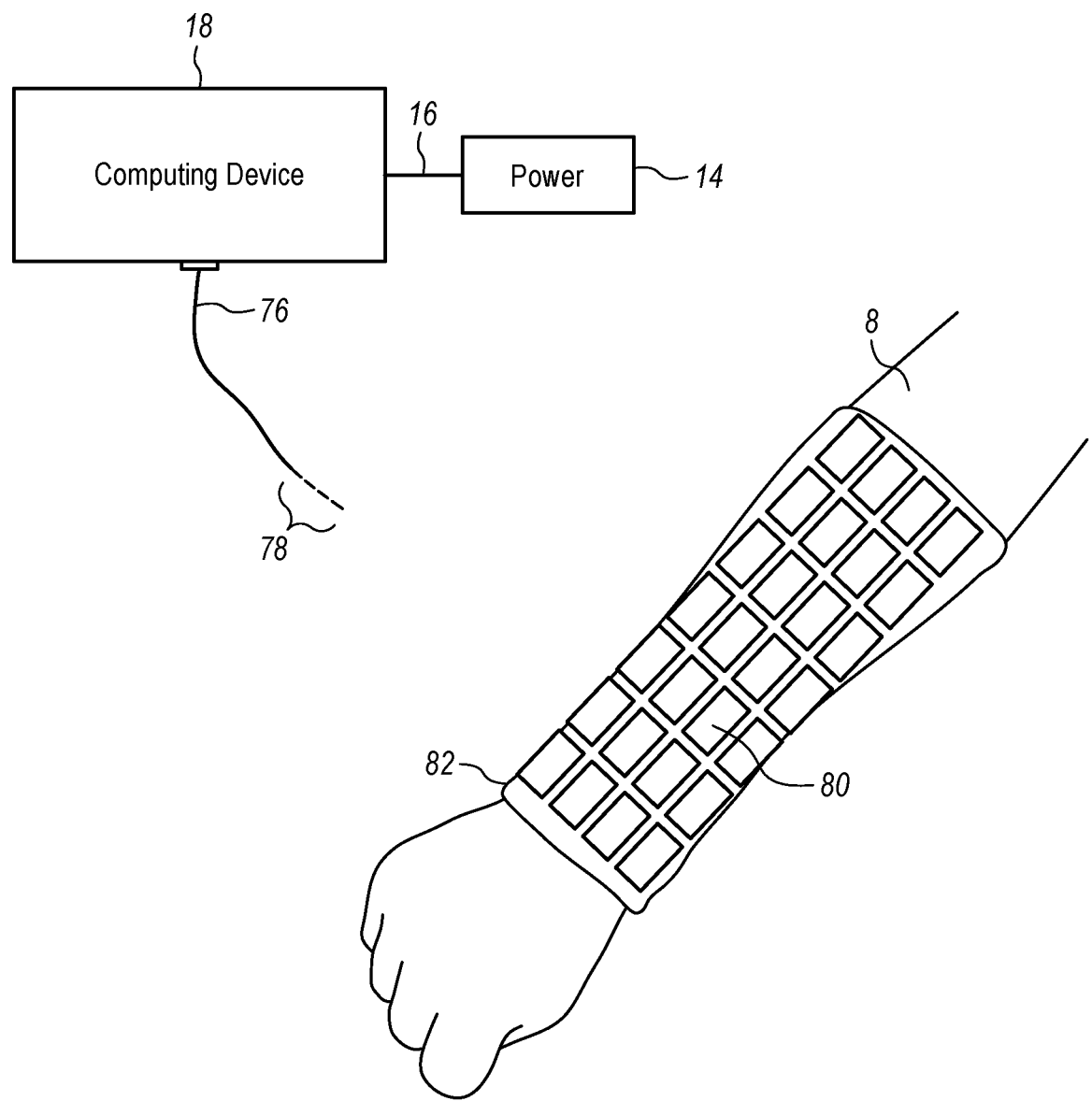

Referring to FIG. 8D, a removable coupling member may be configured to align the assemblies (20) with sensing surfaces oriented toward the surfaces of interest of the object or body portion (such as an arm portion as shown). The removable coupling member may comprise an attachable flexible substrate member such as a textile or polymeric sheet, which may be at least partially elastomeric, and which may be configured to at least partially encircle the object or body portion of interest. The depicted flexible cuff (82) variation of the removable coupling member may be removably coupled to the forearm (8) of a user or patient. The flexible cuff (82) may be coupled to an array (80) of digital touch sensing assemblies (20) which may be operatively coupled (76, 78), such as via a plurality of coupling leads which may be wirelessly interrupted, as noted above, to one of more computing devices (18). The array (80) may be configured to partially or completely surround the forearm (8) of the user or patient, and the system may be utilized to gather data pertaining to the motion and expansion of the forearm during activity as it interfaces with the various digital touch sensing assemblies (20).

Figure 9A:
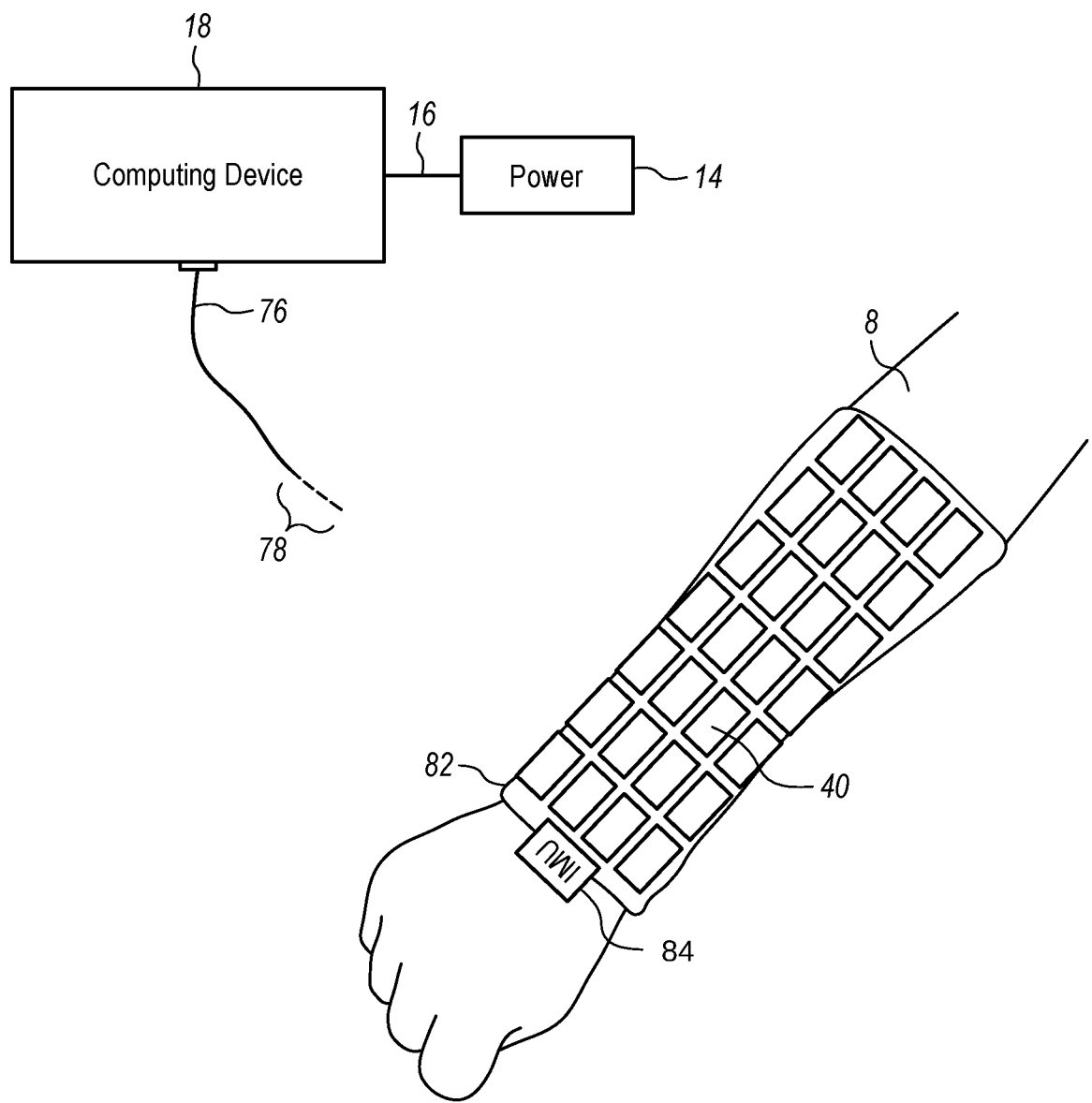
Figure 9B:
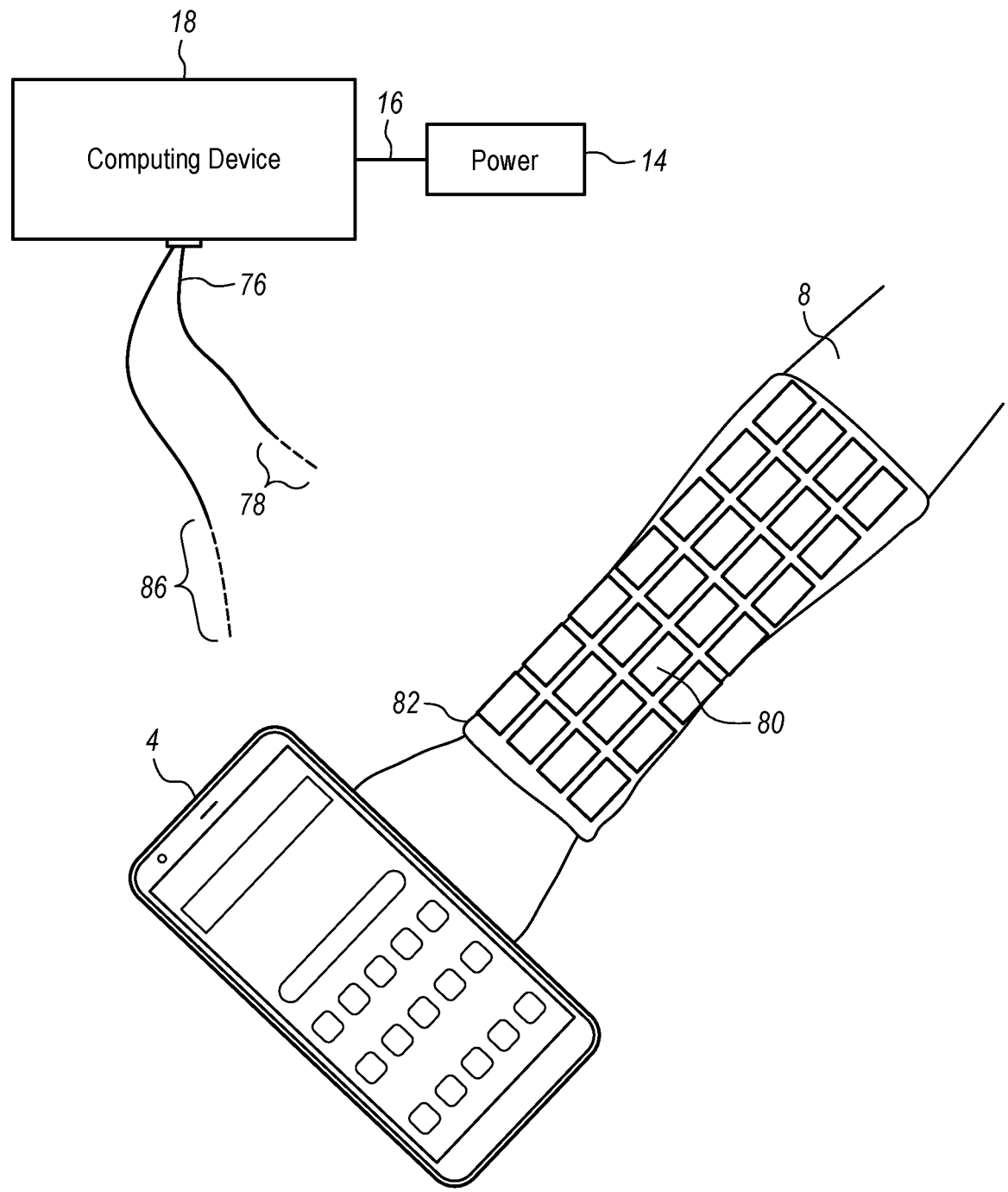

Referring to FIG. 9A, one or more "secondary sensors", such as an accelerometer, gyro, moisture sensor, or inertial measurement unit ("IMU") may be coupled to the cuff or array (80), or in another embodiment not co-located with the cuff or array (80) but coupled to another portion of the person or object, and operatively coupled to the computing system (18) to assist in providing additional data pertaining to the movement and operation of the user's forearm (8) while the system simultaneously gathers data pertaining to the forearm (8) operation using the array (80) of digital touch sensing assemblies (20). FIG. 9B illustrates that a smartphone (4) or similar device which comprises an IMU as well as other sensors, may be transiently coupled to the hand, such as via a hand grasp, and operatively coupled to a subject computing device (18), such as via wireless connectivity (86), to assist in providing IMU and other data while the system simultaneously gathers data pertaining to the forearm (8) operation using the array (80) of digital touch sensing assemblies (20).

Figure 9C:
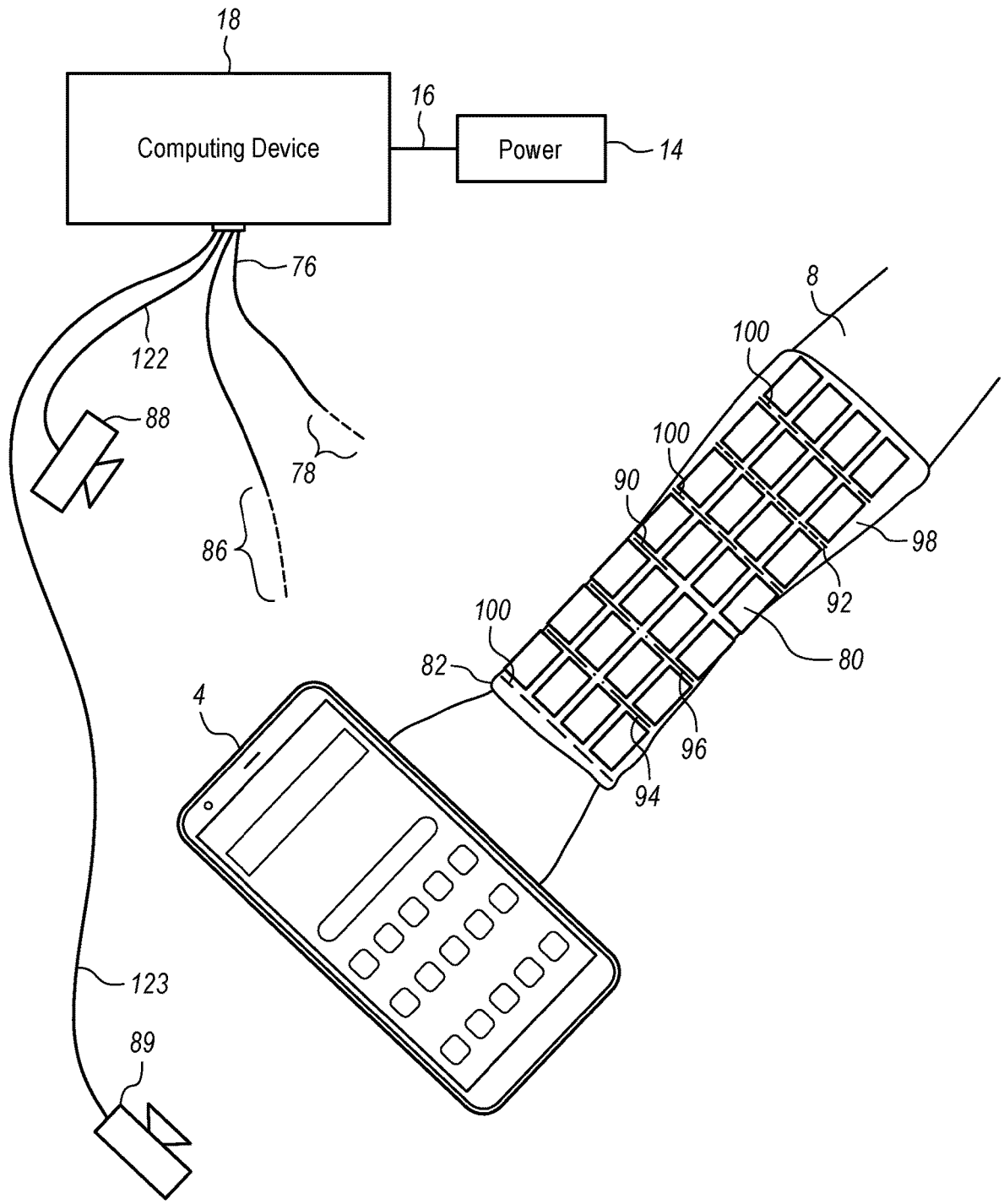
Figure 9D:
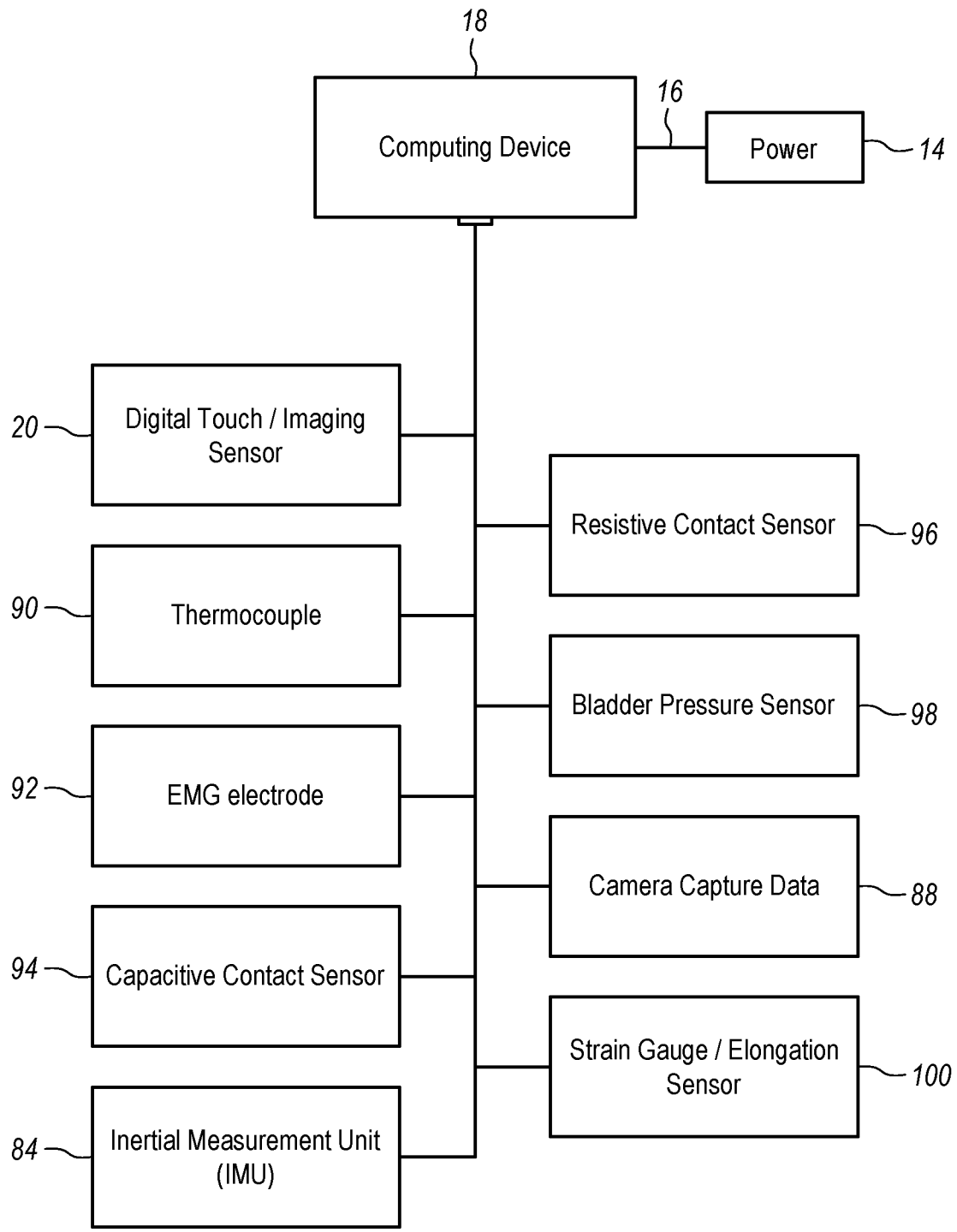

Indeed, referring to FIGS. 9C and 9D, a variety of sensing devices may be operatively coupled to the array (80) of digital touch sensing assemblies (20) to provide a relatively robust amount of data pertaining to the operation, motion, repositioning, re-orientation of the subject forearm (8). For example, the system configuration of FIG. 9C features a plurality of operatively intercoupled (122, 123) external imaging devices (88, 89), such as camera sensors, configured to capture images of the subject forearm, which may be contemporarily captured along with touch sensing data from the digital touch sensing assemblies (20), along with data from one or more thermocouples or temperature sensors (90), strain gauges or elongation sensors (100; each shown in a hoop type of configuration around the circumference of the cuff 82), capacitive contact sensors (94), resistive contact sensors (96), electro-myogram ("EMG") muscle activation electrode/sensors (92), and pressure sensors (98; may be intercoupled with an inflatable bladder), each of which may be operatively coupled to the cuff (82) and computing device (18).

Referring to FIGS. 10A, 10B, 11A, and 11B, various configurations are illustrated wherein systems and integrations such as those illustrated in FIGS. 9C and 9D may be utilized.

Figure 10A:
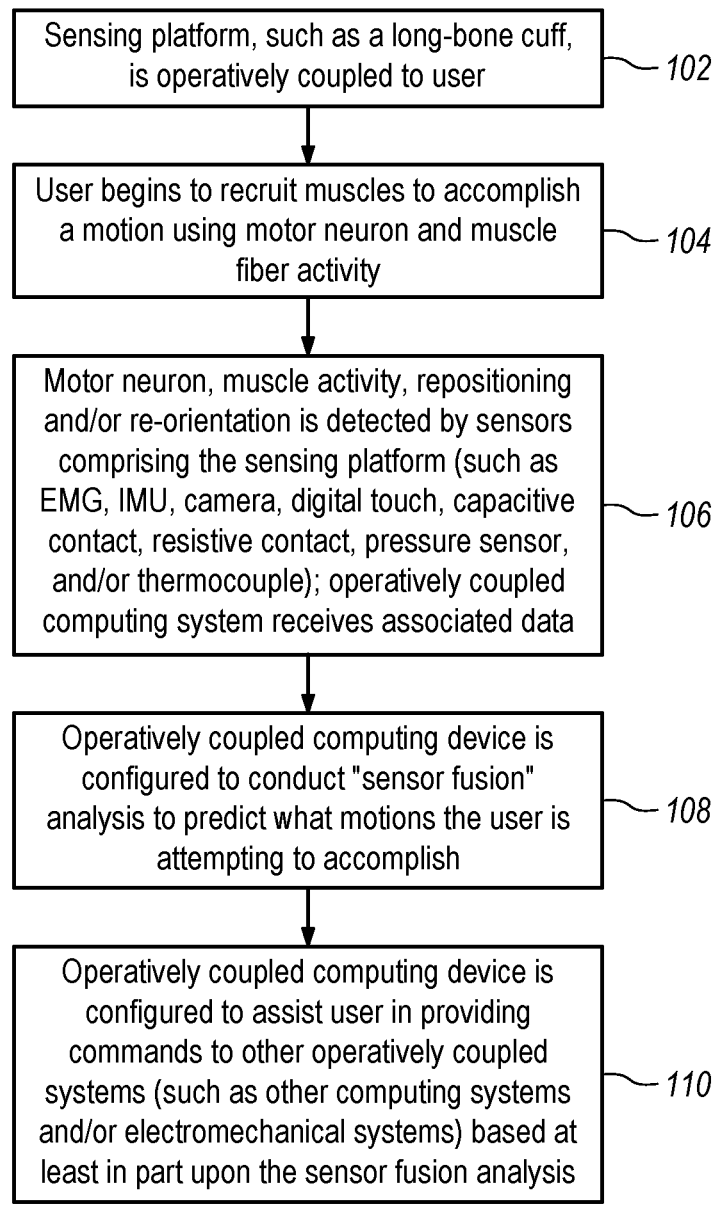

Referring to FIG. 10A, a sensing platform, such as a long bone cuff, such as that described in reference to FIG. 9C, may be operatively coupled to a user, such as via coupling a cuff to a forearm, finger, or portion of a leg of the user (102). The user may begin to recruit muscles to accomplish a motion using motor neuron and muscle fiber activity (104). Motor neuron, muscle activity, repositioning and/or re-orientation may be detected by sensors comprising the sensing platform (such as EMG, IMU, camera, digital touch, capacitive contact, resistive contact, pressure sensor, and/or thermocouple) such that the operatively coupled computing system receives associated data (106). The operatively coupled computing device may be configured to conduct "sensor fusion" or multi-sensor analysis to predict what motions the user is attempting to accomplish (108). For example, given the known kinematics and kinematic singularities of the human upper appendage, along with real or near-real time data from the operatively coupled sensors, the computer system may be configured to infer what the human user is trying to accomplish as the motion starts and then continues—and such inference may be utilized to assist in quickly building and refining commands, which may be utilized to instruct an intercoupled system, such as another computing system or a robotic system. Sensor fusion techniques may also be utilized to smooth commands as they are inferred, for example in the case of a user with a tremor, neurological disorder or injury, or a kinematic disability such as limited range of motion (for example, the system may be configured to essentially smooth and gain commands from a user with limited motion). Thus the operatively coupled computing device may configured to assist user in providing commands to other operatively coupled systems (such as other computing systems and/or electromechanical systems) based at least in part upon the sensor fusion analysis (110).

Figure 10B:
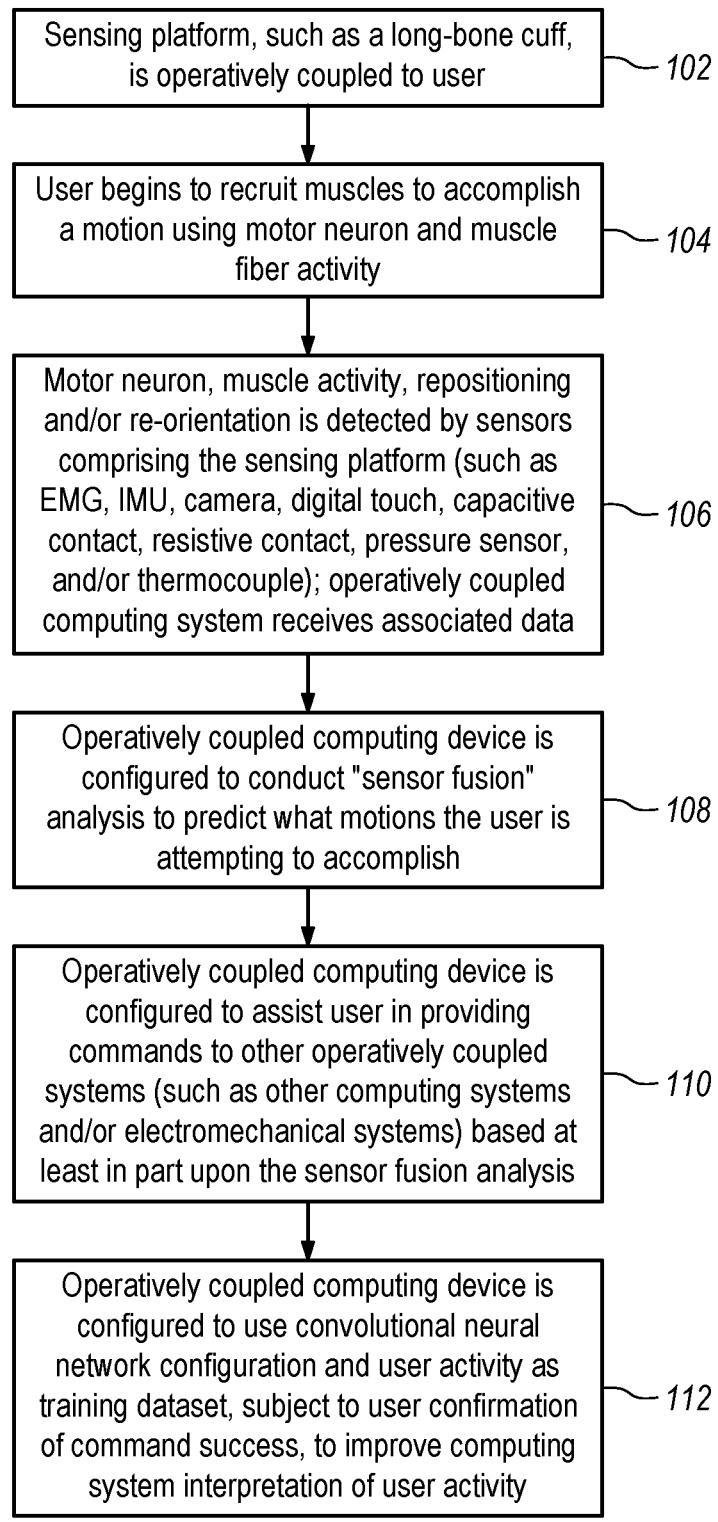

Referring to FIG. 10B, a configuration similar to that of FIG. 10A is illustrated, with the additional feature of the operatively coupled computing system being configured to use a convolutional neural network configuration and user activity as training dataset, subject to user confirmation of command success, to improve computing system interpretation of user activity (112). In other words, the system may be configured to improve upon its ability to infer commands of the user by using the user's activity as a training dataset.

In other words, the computing system may be further configured to assist in predicting commands of the user based at least in part upon both the secondary sensor or indicator output and the characterization of the geometric profile of the surface as analyzed at runtime utilizing a neural network computing configuration trained using a library of prior operation data. The neural network computing configuration, which may utilize so-called "machine learning", may be trained utilizing a library of prior operation data based upon similar combinations of touch sensing assemblies and interfaced body portions for a plurality of different users. The neural network computing configuration may be trained utilizing a library of prior operation data based upon similar combinations of touch sensing assemblies and interfaced body portions for a plurality of different prior sessions with the same user. The neural network computing configuration is trained based upon a supervised learning model wherein a training library comprising a relatively large number predetermined relationships between characterized surface profiles, secondary sensor outputs, and intended user commands is utilized to develop correlations. The neural network computing configuration may be trained based upon a reinforcement learning model wherein a training library comprising a relatively large number predetermined relationships between characterized surface profiles, secondary sensor outputs, intended user commands, and intended user objectives is utilized to develop correlations.

Figure 11A:
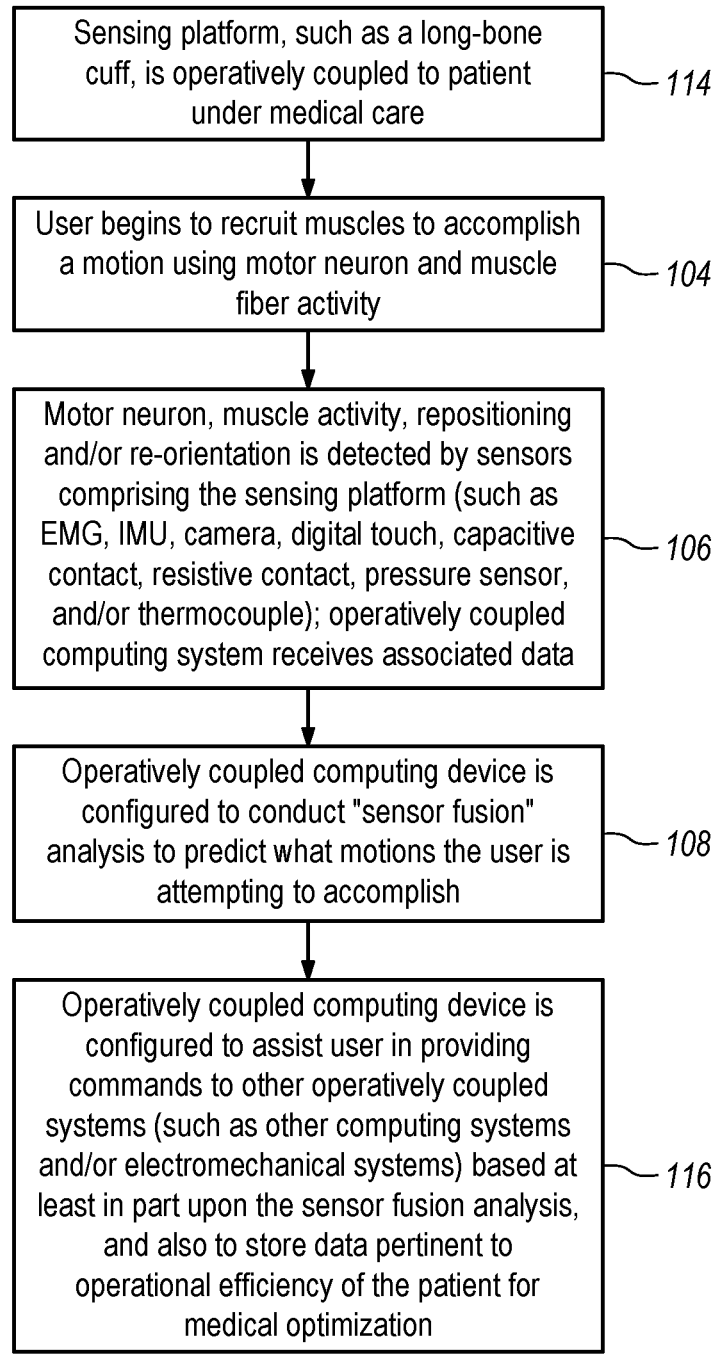

Referring to FIG. 11A, in a medical patient care environment, a sensing platform, such as a long-bone cuff, may be operatively coupled to patient under medical care (114). The user may begin to recruit muscles to accomplish a motion using motor neuron and muscle fiber activity (104). Motor neuron, muscle activity, repositioning and/or re-orientation may be detected by sensors comprising the sensing platform (such as EMG, IMU, camera, digital touch, capacitive contact, resistive contact, pressure sensor, and/or thermocouple) such that the operatively coupled computing system receives associated data (106). The operatively coupled computing device may be configured to conduct "sensor fusion" or multi-sensor analysis to predict what motions the user is attempting to accomplish (108). For example, given the known kinematics and kinematic singularities of the human upper appendage, along with real or near-real time data from the operatively coupled sensors, the computer system may be configured to infer what the human user is trying to accomplish as the motion starts and then continues and such inference may be utilized to assist in quickly building and refining commands, which may be utilized to instruct an intercoupled system, such as another computing system or a robotic system. Sensor fusion techniques may also be utilized to smooth commands as they are inferred, for example in the case of a user with a tremor, neurological disorder or injury, or a kinematic disability such as limited range of motion (for example, the system may be configured to essentially smooth and gain commands from a user with limited motion). The operatively coupled computing device may be configured to assist user in providing commands to other operatively coupled systems (such as other computing systems and/or electromechanical systems) based at least in part upon the sensor fusion analysis, and also to store data pertinent to operational efficiency of the patient for medical optimization (116).

Figure 11B:
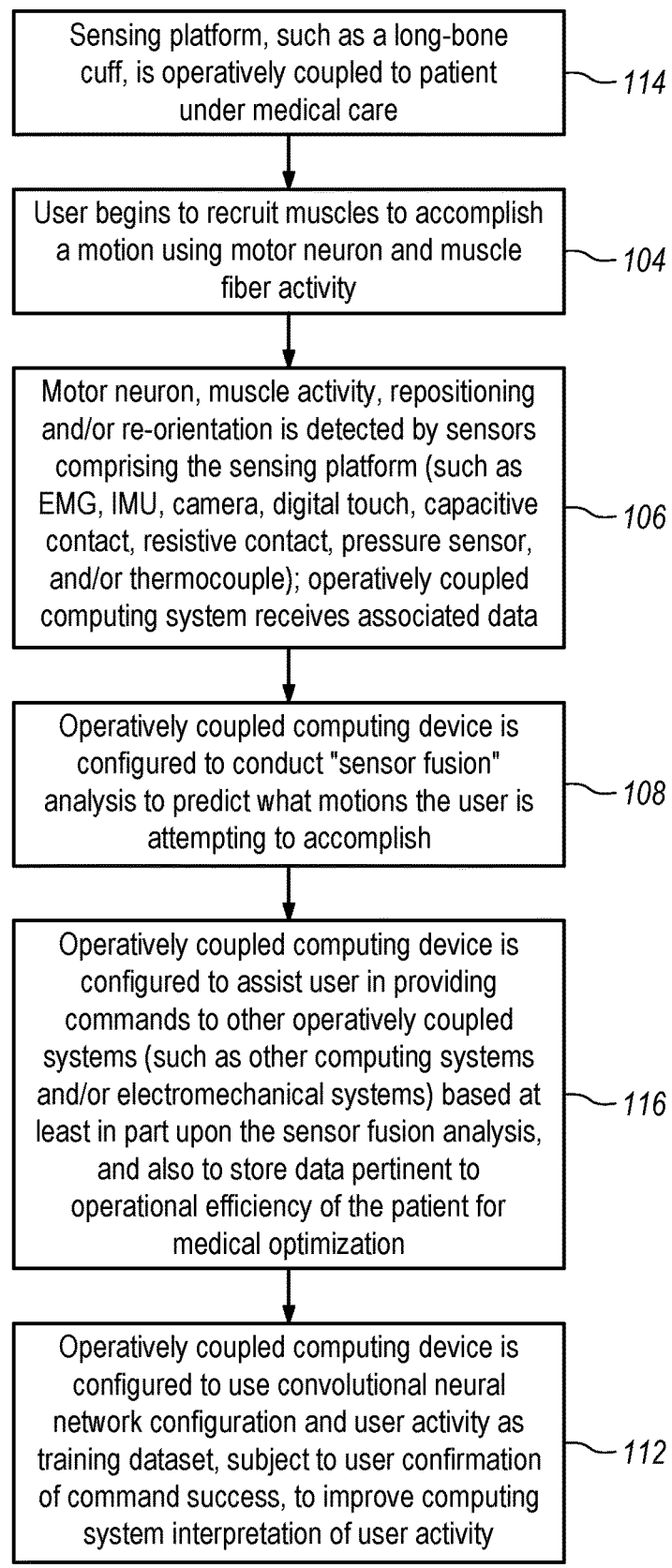

Referring to FIG. 11B, a configuration similar to that of FIG. 11A is illustrated, with the addition that the operatively coupled computing system may be configured to use convolutional neural network configuration and user activity as training dataset, subject to user confirmation of command success, to improve computing system interpretation of user activity (112).

Figure 12:
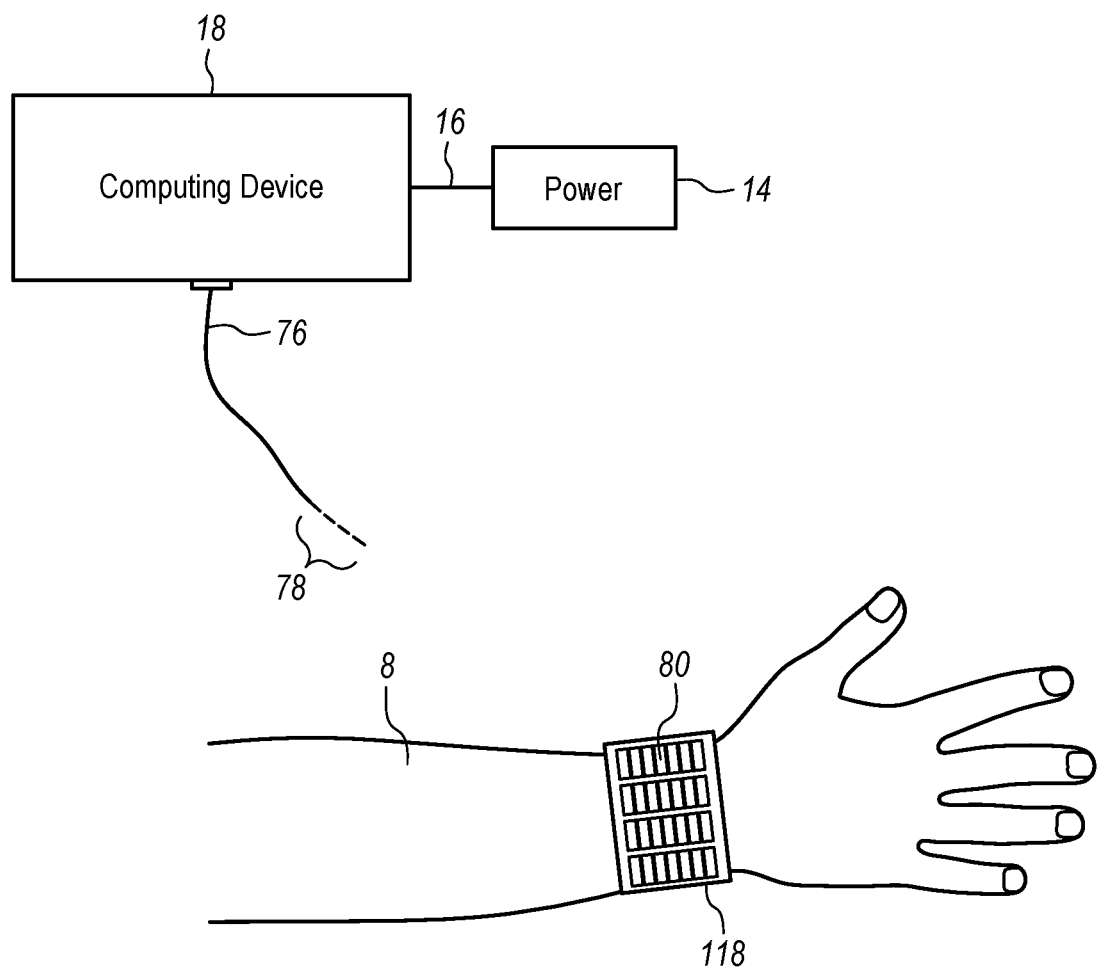
Figure 13:
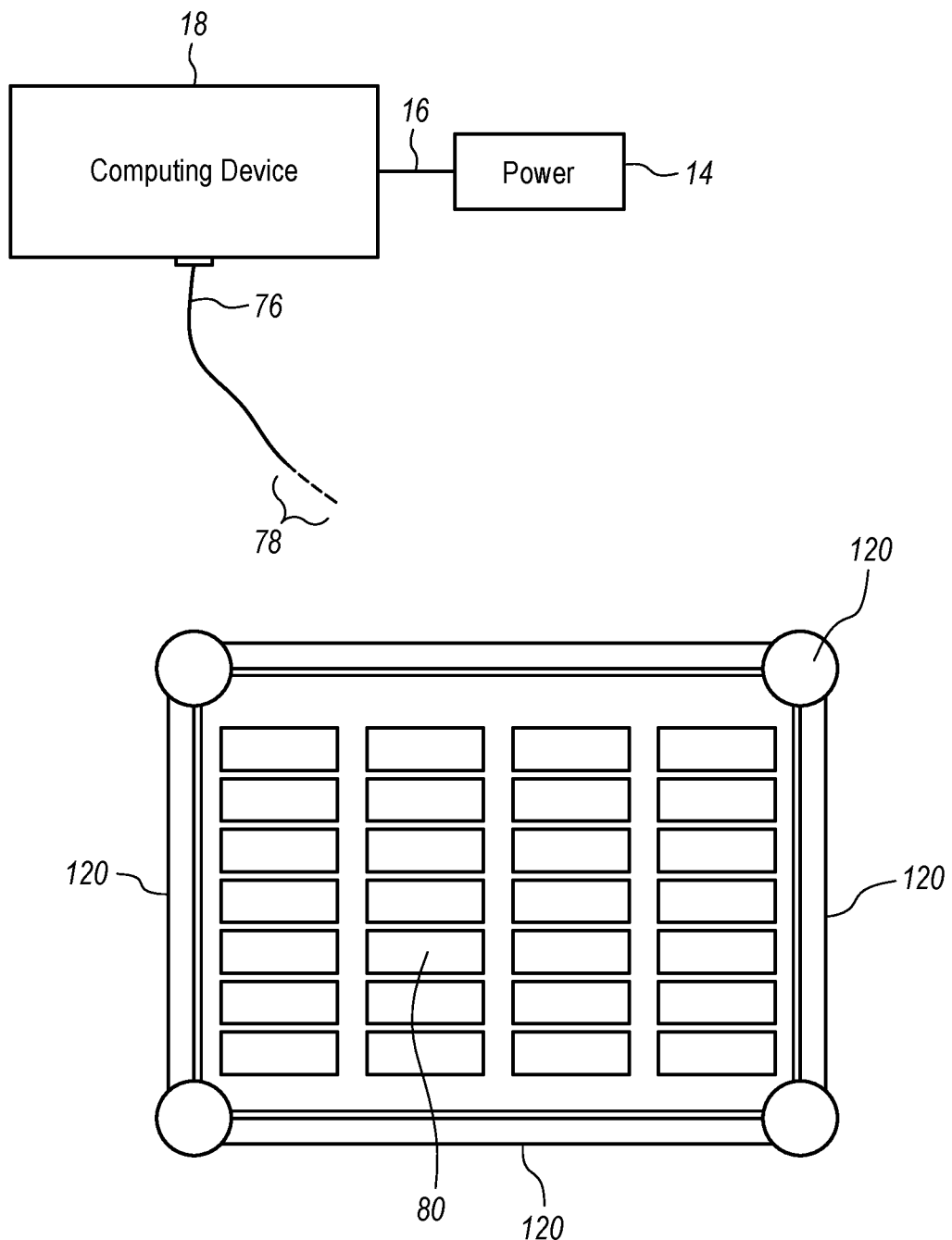

Referring to FIG. 12, a smaller wrist cuff (118) is shown to illustrate that a compact configuration may be utilized. Similarly, a glove or portion thereof may be utilized to couple a sensing array (80) to a finger or portion thereof. Referring to FIG. 13, in the opposite geometric direction, a larger array (80) of digital touch sensing assemblies (20) may be configured to assist in monitoring the interfacing between a patient and a bed, such as a hospital bed, by operatively coupling an array to a bed frame (120) or blanket or pad. Similarly, an array operatively coupled to a blanket, drape, pad, or bandage may be utilized to monitor contact between a patient and a drape or bandage, such as in a load-sensitive healing scenario such as burn care of skin grafting.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

Any of the devices described for carrying out the subject diagnostic or interventional procedures may be provided in packaged combination for use in executing such interventions. These supply "kits" may further include instructions for use and be packaged in sterile trays or containers as commonly employed for such purposes.

The invention includes methods that may be performed using the subject devices. The methods may comprise the act of providing such a suitable device. Such provision may be performed by the end user. In other words, the "providing"

act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The invention claimed is:

1. A system for characterizing interaction between surfaces, comprising:
   a. a deformable transmissive layer coupled to an interface membrane, wherein the interface membrane is interfaced against at least one aspect of an interfaced object, the deformable transmissive layer comprising an elastomeric composite having a metal oxide pigment material distributed within an elastomeric matrix, the pigment material configured to provide an illumination reflectance which is greater than that of the elastomeric matrix;
   b. a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer;
   c. a detector configured to detect light from within at least a portion of the deformable transmissive layer; and
   d. a computing system configured to operate the detector to detect at least a portion of light directed from the deformable transmissive layer, to determine surface orientations pertaining to positions along the interface membrane based at least in part upon interaction of the first illumination light with the deformable transmissive layer, and to utilize the determined surface orientations to characterize a geometric profile of the at least one aspect of the interfaced object as interfaced against the interface membrane.

2. The system of claim 1, wherein the interface membrane is directly coupled between the deformable transmissive layer and the interfaced object.

3. The system of claim 1, further comprising substantially rigid optical element positioned between the detector and the deformable transmissive layer.

4. The system of claim 3, wherein the first illumination source is directly coupled to the substantially rigid optical element, and wherein the substantially rigid optical element is configured to distribute the first illumination light to the deformable transmissive layer.

5. The system of claim 3, wherein the substantially rigid optical element is defined by a bottom surface, a top surface, and one or more sidewall surfaces, wherein the bottom surface is directly coupled to the deformable transmissive layer and the top surface is positioned most proximally adjacent to the detector.

6. The system of claim 5, wherein the substantially rigid optical element comprises an outer shape substantially similar to one selected from the group consisting of: a cylindrical shape, a cubic shape, and a rectangular prismic shape.

7. The system of claim 5, wherein the first illumination source is coupled to at least one of the one or more sidewall surfaces of the substantially rigid optical element.

8. The system of claim 1, further comprising a second illumination source operatively coupled to the deformable transmissive layer and configured to emit second illumination light into the deformable transmissive layer at a known second illumination orientation relative to the deformable transmissive layer, such that at least a portion of the second illumination light interacts with the deformable transmissive layer.

9. The system of claim 8, wherein the detector is further configured to detect light from within at least a portion of the deformable transmissive layer based upon both the first illumination light and second illumination light, and wherein the computing system is configured to operate the detector to detect at least a portion of the first and second illumination light directed from the deformable transmissive layer, to determine surface orientations pertaining to positions along the interface membrane based at least in part upon interaction of the first and second illumination light with the deformable transmissive layer, and to utilize the determined surface orientations to characterize a geometric profile of the at least one aspect of the interfaced object as interfaced against the interface membrane.

10. The system of claim 8, wherein the second illumination light and first illumination light have different wavelengths.

11. The system of claim 8, wherein the second illumination light and first illumination light have different polarization.

12. The system of claim 9, further comprising a third illumination source operatively coupled to the deformable transmissive layer and configured to emit third illumination light into the deformable transmissive layer at a known third illumination orientation relative to the deformable transmissive layer, such that at least a portion of the third illumination light interacts with the deformable transmissive layer.

13. The system of claim 10, wherein the detector is further configured to detect light from within at least a portion of the deformable transmissive layer based upon each of the first, second, and third illumination light, and wherein the computing system is configured to operate the detector to detect at least a portion of the first, second, and third illumination light directed from the deformable transmissive layer, to determine surface orientations pertaining to positions along the interface membrane based at least in part upon interaction of the first, second, and third illumination light with the deformable transmissive layer, and to utilize the determined surface orientations to characterize a geometric profile of the at least one aspect of the interfaced object as interfaced against the interface membrane.

14. The system of claim 10, wherein each of the first, second, and third illumination light have different wavelengths.

15. The system of claim 10, wherein the first, second, and third illumination light do not all have the same polarization.

16. The system of claim 1, wherein the first illumination source comprises a light emitting diode.

17. The system of claim 1, wherein the detector is a photodetector.

18. The system of claim 1, wherein the detector is an image capture device.

19. The system of claim 18, wherein the image capture device is a CCD or CMOS device.

20. The system of claim 1, further comprising a lens operatively coupled between the detector and the deformable transmissive layer.

21. The system of claim 1, wherein the computing system is operatively coupled to the detector and configured to receive information from the detector pertaining to light detected by the detector from within the deformable transmissive layer.

22. The system of claim 1, wherein the computing system is operatively coupled to the first illumination source and is configured to control emissions from the first illumination source.

23. The system of claim 1, wherein the elastomeric material is selected from the group consisting of: silicone, urethane, polyurethane, thermoplastic elastomer (TPE), and thermoplastic polyurethane (TPU).

24. The system of claim 1, wherein the pigment material comprises a metal oxide selected from the group consisting of: iron oxide, zinc oxide, aluminum oxide, and titanium dioxide.

25. The system of claim 1, wherein the deformable transmissive layer is bounded by a bottom surface directly coupled to the interface membrane, a top surface most adjacent the detector, and a transmissive layer thickness therebetween, wherein the pigment material is distributed adjacent the bottom surface within the transmissive layer thickness to provide optimized illumination reflectance adjacent the bottom surface.

26. The system of claim 1, wherein the interface membrane comprises an elastomeric material.

27. The system of claim 1, wherein the interface member and deformable transmissive layer each have an elastic modulus which is substantially the same.

28. The system of claim 1, wherein the deformable transmissive layer and interface membrane are directly coupled such that both principal and shear loads applied by the interfaced object are substantially transferred across the interface membrane to the deformable transmissive layer.

29. The system of claim 1, wherein the deformable transmissive layer comprises a configured to be at least partially filled with a fluid.

30. The system of claim 1, wherein the interface membrane comprises an assembly of relatively thin and sequentially removable membrane components.

* * * * *